(12) United States Patent
Ali et al.

(10) Patent No.: US 10,904,152 B2
(45) Date of Patent: Jan. 26, 2021

(54) HARDWARE-FRIENDLY MECHANISMS FOR IN-BAND OAM PROCESSING

(71) Applicant: Cisco Technology, Inc., San Jose, CA (US)

(72) Inventors: Zafar Ali, Hicksville, NY (US); Clarence Filsfils, Brussels (BE); Francois Clad, Strasbourg (FR); Faisal Iqbal, Ottawa (CA); Mohmad Saleem Hafeez, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/359,180

(22) Filed: Mar. 20, 2019

(65) Prior Publication Data

US 2020/0195568 A1  Jun. 18, 2020

Related U.S. Application Data

(60) Provisional application No. 62/780,683, filed on Dec. 17, 2018.

(51) Int. Cl.
*H04L 12/841* (2013.01)
*H04L 12/741* (2013.01)
(Continued)

(52) U.S. Cl.
CPC .......... *H04L 47/283* (2013.01); *H04L 1/0061* (2013.01); *H04L 45/50* (2013.01);
(Continued)

(58) Field of Classification Search
CPC ... H04L 47/283; H04L 1/0061; H04L 49/252; H04L 49/20; H04W 40/24
See application file for complete search history.

(56) References Cited

U.S. PATENT DOCUMENTS 6,785,237 B1 *  8/2004  Sufleta ................... H04L 43/12
                                                          370/236
7,200,105 B1 *  4/2007  Milliken ............. H04L 63/1416
                                                          370/216
(Continued)

OTHER PUBLICATIONS

International Search Report and Written Opinion in counterpart International Application No. PCT/US2019/065370, dated Feb. 20, 2020, 16 pages.
(Continued)

*Primary Examiner* — Mohammad S Anwar
(74) *Attorney, Agent, or Firm* — Edell, Shapiro & Finnan, LLC

(57) ABSTRACT

In one illustrative example, a network node (e.g. a router or switch) may receive a data packet and timestamp a copy of the data packet. The node may also compute a signature for the copy and insert the signature in a header of the copy. The node may send the copy to a controller for correlation with one or more other timestamped data packet copies of the data packet from one or more other network nodes having the same signature and for the computation of delay. The original data packet may be forwarded to a next network node without any timestamp or other metadata added to it. The processing of the data packets may be performed as part of a function for punting the timestamped data packet copy and forwarding, or as a function for forwarding and punting the timestamped data packet copy.

20 Claims, 27 Drawing Sheets

(51) Int. Cl.

| | |
|---|---|
| *H04L 12/723* | (2013.01) |
| *H04W 40/24* | (2009.01) |
| *H04L 12/931* | (2013.01) |
| *H04L 12/947* | (2013.01) |
| *H04W 88/18* | (2009.01) |
| *H04L 1/00* | (2006.01) |

(52) U.S. Cl.
CPC .............. *H04L 45/74* (2013.01); *H04L 49/20* (2013.01); *H04L 49/252* (2013.01); *H04W 40/24* (2013.01); *H04W 88/18* (2013.01)

(56) References Cited

U.S. PATENT DOCUMENTS

| | | | |
|---|---|---|---|
| 8,570,872 B2 | 10/2013 | Wiley et al. | |
| 9,906,457 B2 | 2/2018 | Kompella | |
| 10,075,370 B2 | 9/2018 | Agarwal et al. | |
| 2003/0023710 A1 | 1/2003 | Corlett et al. | |
| 2005/0044351 A1* | 2/2005 | Harvey | H04L 9/3297 713/153 |
| 2006/0159028 A1* | 7/2006 | Curran-Gray | H04L 43/026 370/252 |
| 2008/0031146 A1 | 2/2008 | Kwak et al. | |
| 2011/0119534 A1* | 5/2011 | Liu | H04L 61/6059 714/48 |
| 2013/0329584 A1* | 12/2013 | Ghose | H04L 45/586 370/252 |
| 2014/0013352 A1* | 1/2014 | Shavit | H04N 21/23418 725/34 |
| 2016/0127225 A1 | 5/2016 | Cai et al. | |
| 2016/0301589 A1 | 10/2016 | Rata et al. | |
| 2016/0315850 A1 | 10/2016 | Dara et al. | |
| 2017/0085581 A1* | 3/2017 | Jackson | H04L 43/0858 |
| 2017/0359265 A1 | 12/2017 | Bosch et al. | |
| 2017/0366467 A1* | 12/2017 | Martin | H04L 47/2433 |
| 2017/0373966 A1* | 12/2017 | Liao | H04L 45/507 |
| 2018/0176134 A1 | 6/2018 | Pignataro et al. | |
| 2018/0278548 A1 | 9/2018 | Pignataro et al. | |
| 2018/0331933 A1* | 11/2018 | Song | H04L 29/0653 |
| 2019/0037391 A1 | 1/2019 | Pignataro et al. | |

OTHER PUBLICATIONS

Z. Ali et al., "Operations, Administration, and Maintenance (OAM) in Segment Routing Networks with IPv6 Data plane (SRv6)", draft-ali-spring-srv6-oam-01.txt, SPRING Working Group, Internet-Draft, Intended status: Standards Track, Jul. 2, 2018, 28 pages.

C. Filsfils et al., "SRv6 Network Programming", draft-filsfils-spring-srv6-network-programming-04, SPRING, Internet-Draft, Intended status: Standards Track, Cisco Systems, Inc., Mar. 4, 2018, 57 pages.

J. Guichard et al., "Carrying Metadata in MPLS Networks", draft-guichard-mpls-metadata-00, Network Working Group, Internet-Draft, Intended status: Standards Track, Jun. 12, 2013, 11 pages.

F. Brockners et al., "Data Fields for In-situ OAM", draft-ietf-ippm-ioam-data-04, ippm, Internet-Draft, Intended status: Standards Track, Oct. 20, 2018, 39 pages.

B. Claise, Ed., "Cisco Systems NetFlow Services Export Version 9", Network Working Group, Request for Comments: 3954, Oct. 2004, 29 pages.

B. Claise, Ed., "Specification of the IP Flow Information Export (IPFIX) Protocol for the Exchange of IP Traffic Flow Information", Network Working Group, Request for Comments: 5101, Category: Standards Track, Jan. 2008, 55 pages.

Clarence Filsfils et al., "The Segment Routing Architecture", IMDEA Networks Institute / UC3M, Dec. 6-10, 2015, 6 pages.

* cited by examiner

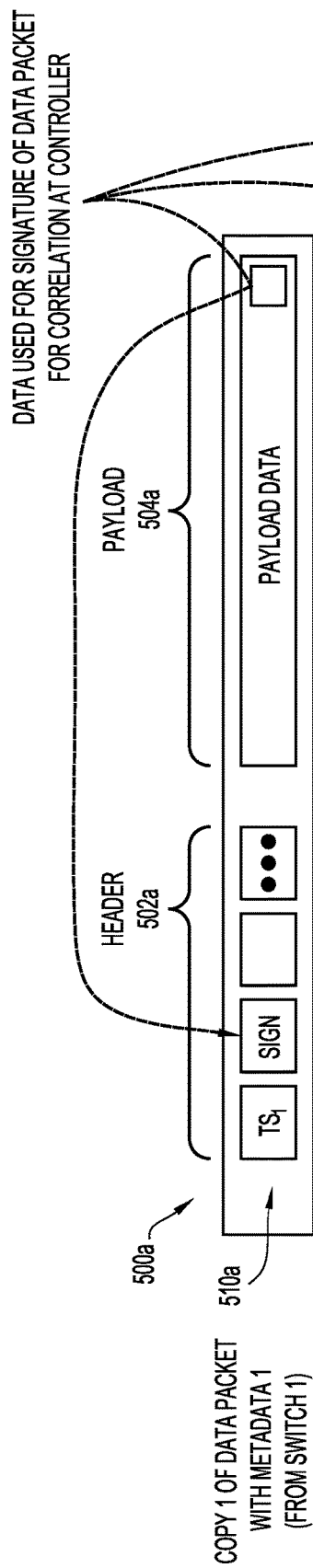
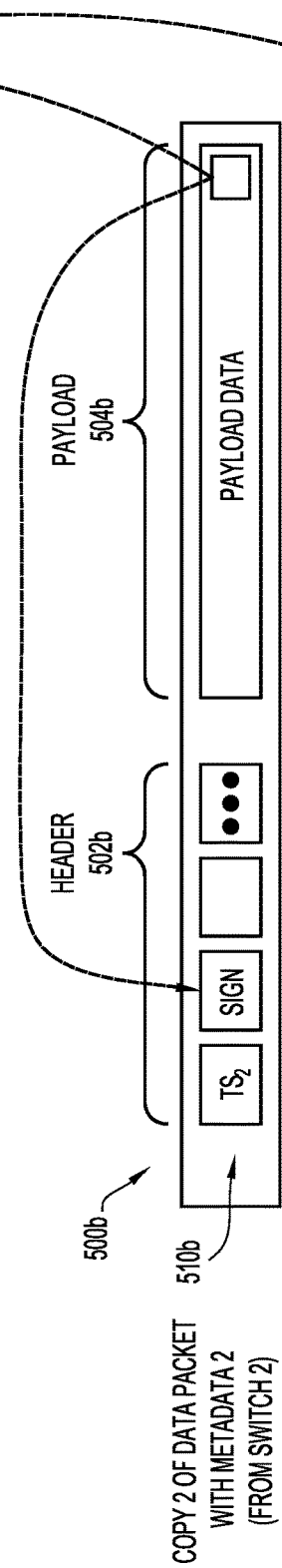
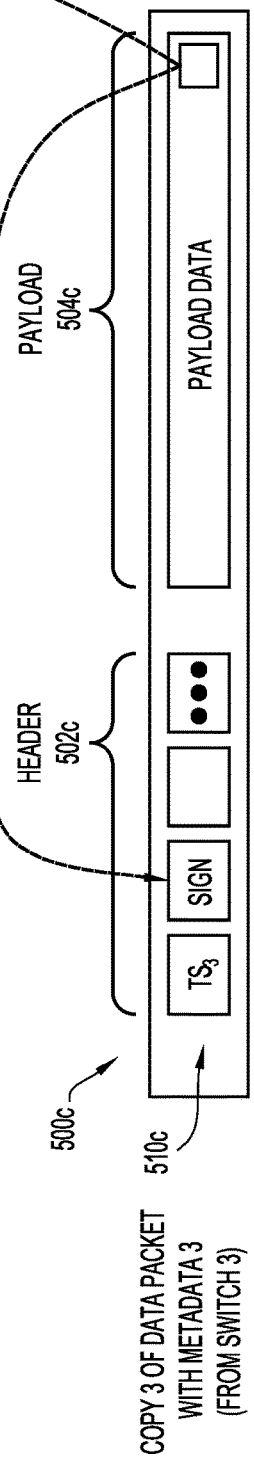
FIG.5A
FIG.5B
FIG.5C

CONTROLLER-RELATED PROCESSING
(CORRELATION OF DATA PACKET COPIES BASED ON SIGNATURE)

| SAMPLE PACKET # | PACKET SIGNATURE | INGRESS TS (Tx1) | SEGMENT (S1) | INGRESS TO S1 DELAY | EGRESS TS (Rx2) | S1 TO EGRESS DELAY | END-TO-END DELAY |
|---|---|---|---|---|---|---|---|
| PACKET COPY 1 | SIGNATURE 1 | T1 | T2 | T2 - T1 | T3 | T3 - T2 | T3 - T1 |
| PACKET COPY 2 | SIGNATURE 2 | T4 | T5 | T5 - T4 | T6 | T6 - T5 | T6 - T4 |
| PACKET COPY 3 | SIGNATURE 3 | T7 | T8 | T8 - T7 | | | PACKET DROPPED; DISCARD |

FIG.11

HARDWARE-FRIENDLY MECHANISMS FOR IN-BAND OAM PROCESSING

CROSS-REFERENCE TO RELATED APPLICATIONS

This application claims priority to U.S. Provisional Application No. 62/780,683, filed Dec. 17, 2018, the entirety of which is incorporated herein by reference.

TECHNICAL FIELD

The present disclosure relates generally to In-band Operations, Administration and Maintenance (iOAM) processing in communication networks.

BACKGROUND

"In-band" or "in-situ" Operations, Administration and Maintenance (iOAM) is one of the requirements in networks such as Fifth Generation (5G) networks. One of the challenges associated with at least some iOAM mechanisms is the difficulty of implementing them in device hardware (e.g. router or switch hardware) without performance penalties.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5C are illustrative representations of a plurality of stamped copies of an original data packet which has traversed a plurality of routers or switches (e.g. S1, S2, and S3 of FIGS. 4A and 4B), where the stamped copies with signatures may be forwarded to a controller for metadata or iOAM processing, according to some implementations;

FIG. 11 is a table of example data associated with the correlating of stamped packets at the controller according to some implementations;

DESCRIPTION OF EXAMPLE EMBODIMENTS

Figure 1A:
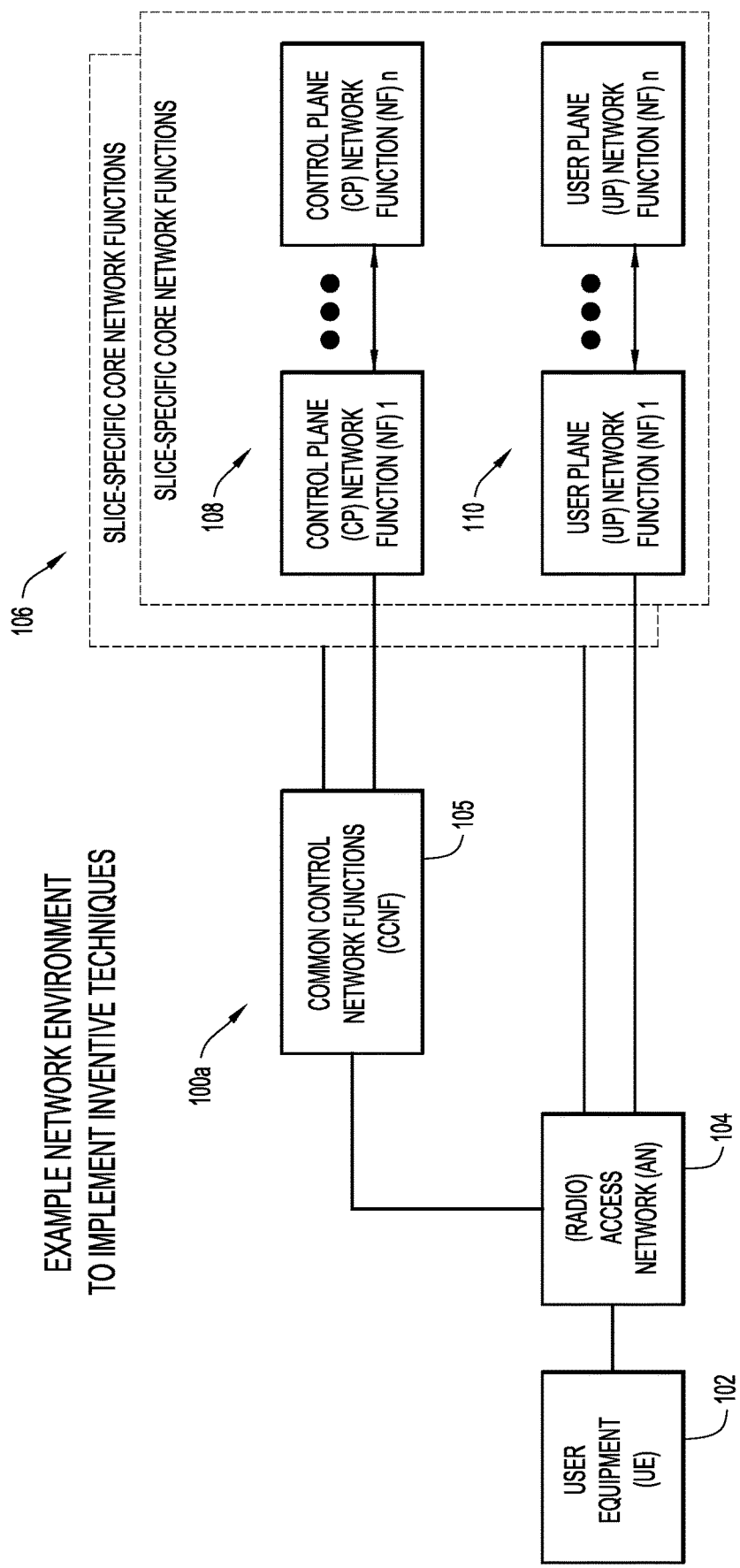
FIG. 1A is an illustrative representation of a basic network architecture of a Fifth Generation (5G) mobile network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Hardware-friendly mechanisms for In-band Operations, Administration and Maintenance (iOAM) processing are described herein.

In one illustrative example, a network node (e.g. a router or switch) may receive a data packet and, if an indicator is identified in a header of the data packet, the network node may obtain a copy of the data packet and timestamp the data packet copy with a timestamp to produce a timestamped data packet copy. The network node may also compute a signature for the timestamped data packet copy and insert the signature in a header of the timestamped data packet copy. The network node may send the timestamped data packet copy to a controller for correlation with one or more other timestamped data packet copies of the data packet from one or more other network nodes having the same signature, to produce correlated timestamped data packet copies. The original data packet may be forwarded to a next network node without any timestamp or other metadata added to it. In some implementations, the processing of the data packets may be performed as part of a function for punting the timestamped data packet copy and forwarding, or as a function for forwarding and punting the timestamped data packet copy. At the controller, a delay associated with the data packet may be computed based on timestamps of the correlated timestamped data packet copies.

In some implementations, the signature may be computed based on at least a portion of a payload of the data packet. The signature may be or based on a cyclical redundancy check (CRC) or a hash of the at least portion of the payload of the data packet. In some implementations, the signature may be inserted as segment ID (SID) information in a segment routing header (SRH) of an SRv6 packet.

In another illustrative example, a controller (e.g. a software-defined network or "SDN" controller or an analytics function such as a network data analytics function or "NWDAF") may receive from a network node a timestamped data packet copy of a data packet that is forwarded from the network node to a next network node. The controller may obtain a signature from a header of the timestamped data packet copy. The controller may correlate the timestamped data packet copy with one or more other received timestamped copies of the data packet from one or more other network nodes having the same signature as the timestamped data packet copy, to produce correlated timestamped data packet copies. The controller may compute a delay of the data packet between network nodes based on timestamps of the correlated timestamped data packet copies. In some implementations, the processing of the data packets at the network node may be performed as part of a function for punting the timestamped data packet copy and forwarding, or as a function for forwarding and punting the timestamped data packet copy, where the original data packet is forwarded to the next network node without any timestamp or other metadata being added to it.

More detailed and alternative techniques and implementations are provided herein as described below.

Example Embodiments

"In-band" or "In-situ" Operations, Administration and Maintenance (iOAM) is one of the requirements in networks such as Fifth Generation (5G) networks. One of the challenges associated with at least some iOAM mechanisms is the difficulty of implementing them in device hardware without performance penalties.

One way to enable iOAM in a segment routing (SR) for IPv6 (SRv6) based network is to carry data in fields of SR header (SRH) type-length-values (TLVs). However, some hardware implementations may be unable to perform such computationally-extensive TLV manipulation in device hardware without adversely affecting performance (e.g. it may not be achievable at the line rate). Thus, enabling iOAM TLVs for a given data packet may potentially adversely affect the timing of the very stream being monitored and troubleshooted.

According to at least some implementations of the present disclosure, what is proposed is a controller-based approach to iOAM which is fundamentally different than current techniques for iOAM, as it does not need to insert any metadata or TLV in the actual customer packets. The techniques may use real customer traffic to telemeter iOAM data in "copied" data packets to the controller. As is apparent, much complexity for iOAM processing is moved from the devices (e.g. routers, switches) to the controller. By moving complexity from the devices to the controller, device hardware implementation may be easier for certain types (or wider varieties) of device hardware.

Further, note that one of the current limitations in SR Multiprotocol Label Switching (MPLS) based networks is that the data-plane is not designed to carry metadata (TLVs) in the data packets. Therefore, current iOAM mechanisms may not be applicable to SR-MPLS. Advantageously, as techniques of the present disclosure do not require data packets to carry metadata, these techniques may be applied to SR-MPLS networks for iOAM processing.

In some implementations, techniques of the present disclosure may be applied to a 5G network. In a 5G network, SR policies must satisfy relatively strict service level agreement (SLA) criteria with respect to delay. Here, the techniques are suitable to provide both end-to-end and segment-by-segment delay measurement. Notably, segment-by-segment delay measurement allows customers to isolate issues with respect to a specific segment in the network. Further note that the present techniques may also provide proof-of-transit with respect to customer traffic.

To better illustrate, FIG. 1A is an illustrative representation of a network architecture 100A of a 5G mobile network. The mobile network is configured to facilitate communications for a user equipment (UE) 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, IoT devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
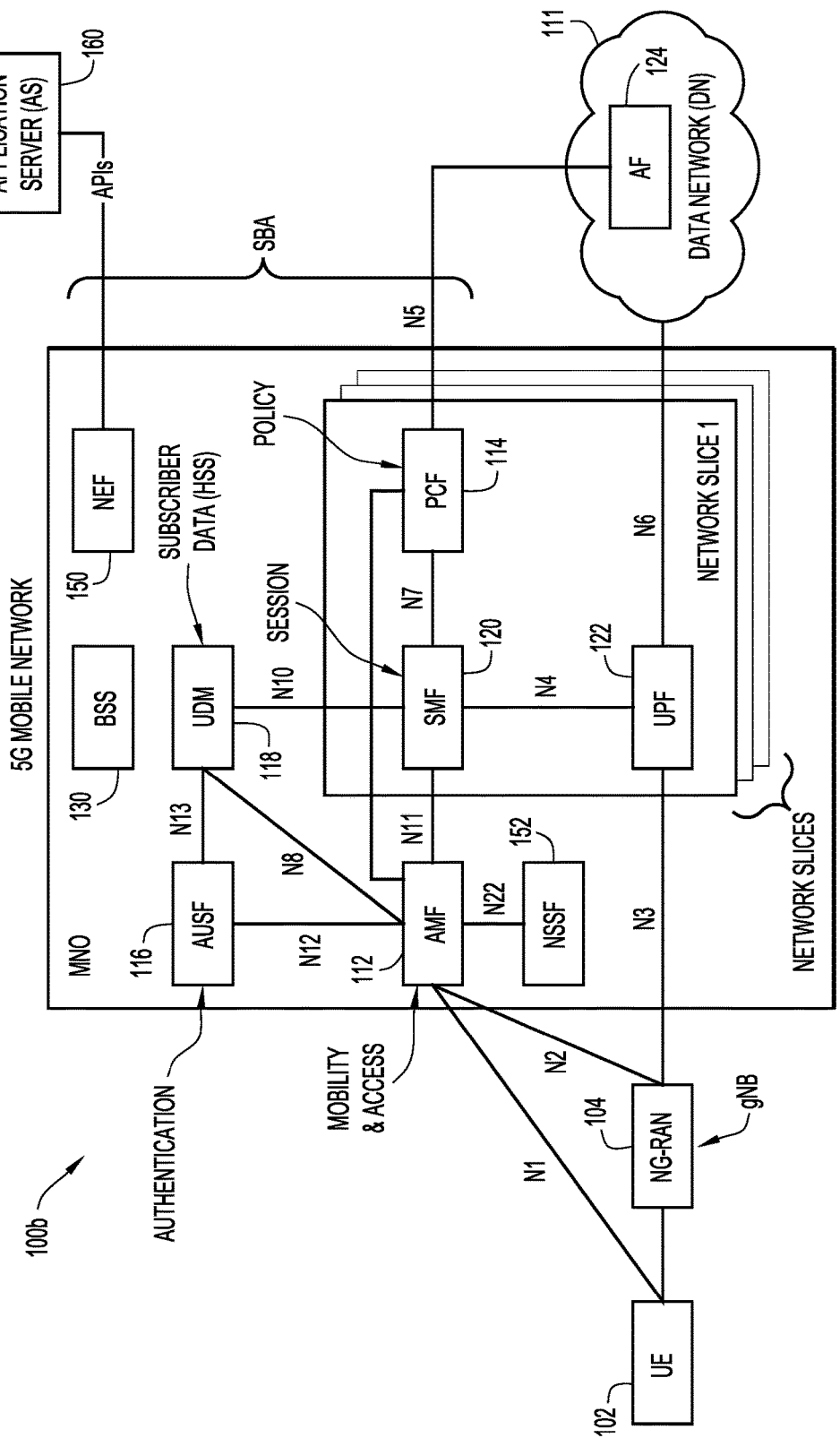
FIG. 1B is an illustrative representation of a more detailed network architecture of the mobile network of FIG. 1A.

FIG. 1B is an illustrative representation of a more detailed network architecture 100B of the 5G mobile network of FIG. 1A. As provided in 3GPP standards for 5G (e.g. 3GPP 23.501 and 23.502), network architecture 100b for the 5G mobile network which is operated by a mobile network operator (MNO) may include an authentication server function (AUSF) 116, a unified data management (UDM) 118 (having a unified data repository or UDR), an AMF 112, a policy control function (PCF) 114, an SMF 120, and a UPF 122. One or more application functions, such as an application function (AF) 124, of a data network (DN) 111 may connect to the 5G mobile network via PCF 114 or UPF 122. A plurality of interfaces and/or reference points N1-N8, N10-N13, N15, and N22 shown in FIG. 1B (as well as others) may define the communications and/or protocols between each of the entities, as described in the relevant (evolving) standards documents.

UPF 122 is part of the user plane and all other NFs (i.e. AMF 112, SMF 120, PCF 114, AUSF 116, and UDM 118) are part of the control plane. Separation of user and control planes guarantees that each plane resource can be scaled independently; it also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120 and UPF 122 of FIG. 1B may be provided as specific instances in a first network slice (e.g. network slice 1) of a plurality of network slice instances made available in the mobile network.

Also as shown in FIG. 1B, a network exposure function (NEF) 150 may be provided in the mobile network. In general, NEF 150 may be configured to receive information from other NFs (e.g. based on exposed capabilities of other NFs) and store the received information as structured data. The storage operations may be performed with use of a standardized interface to a data storage network function. The stored information may be re-exposed by NEF 150 to other NFs and used for other purposes (e.g. analytics). One example use of NEF 150 is to assist in the establishment of an AS-initiated communication with a UE/IoT device, from an application server (AS) 180 through an API (e.g. where no other existing data connection exists).

Figure 1C:
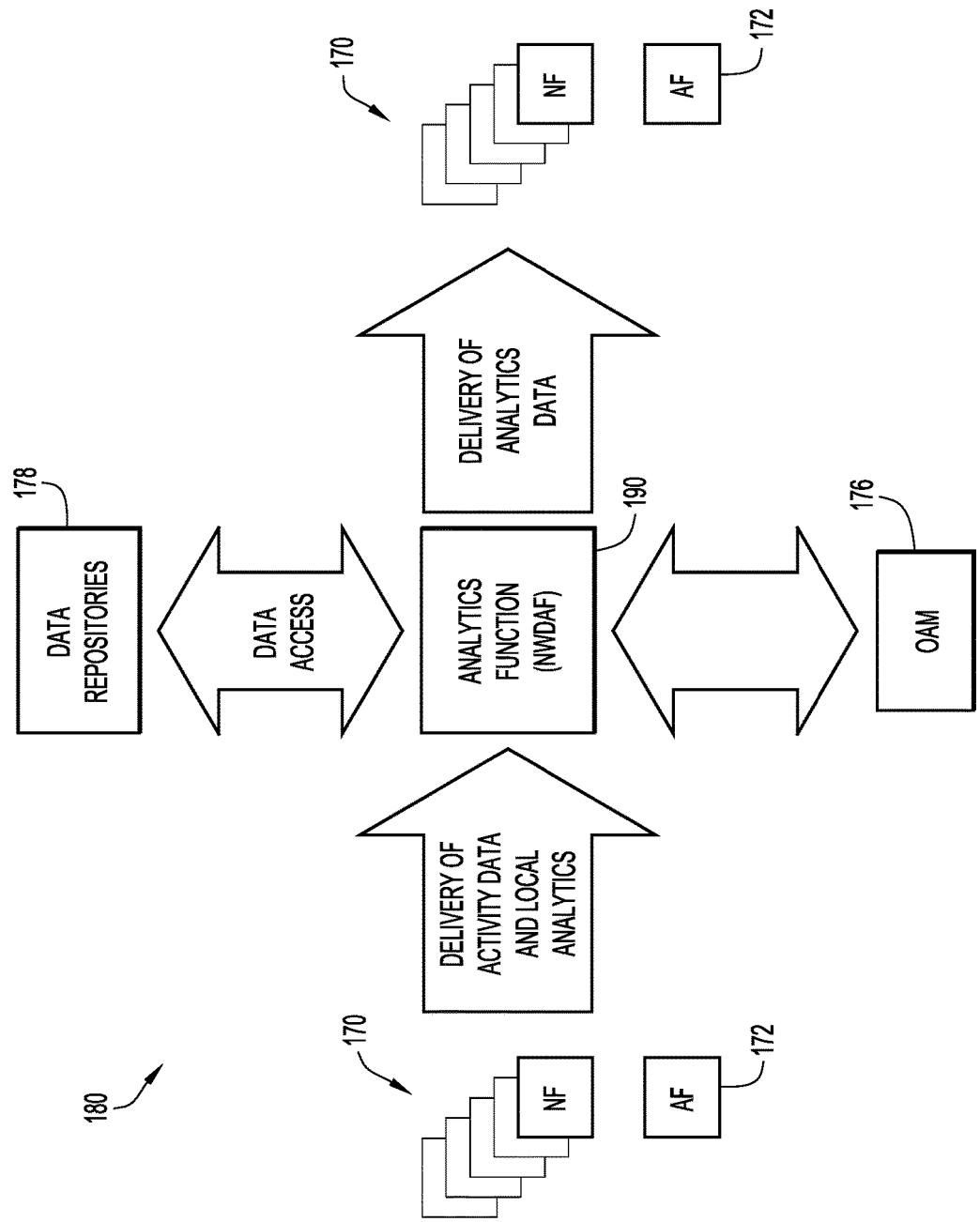
FIG. 1C is an illustrative representation of a network node arrangement which includes an analytics function for use in the mobile network of FIGS. 1A and 1B.

As shown in a network node arrangement 180 of FIG. 1C, an analytics function 190 may also be provided in the 5G mobile network. Analytics function 190 may be a network data analytics function (NWDAF) as described in the relevant (evolving) standards documents, such as TS 23.503 and TS 29.520. Analytics function 190 may be used for data collection and data analytics in a centralized manner. Analytics function 190 may receive activity data and local analytics from NFs 170 or an AF 172, and/or access data from one or more data repositories 178. Resulting analytics data may be generated and sent or otherwise provided by analytics function 190 to the NFs and/or AF 172. Data for OAM may be provided to and from network nodes or OAM-processing nodes 176.

In the present disclosure, implementations may make use of segment routing (SR) for communications in the network. The SR may be SR for IPv6 (SRv6). To illustrate a few SRv6 examples, FIGS. 2A-2D are block diagrams of network nodes which are configured to route packets using SRv6.

Figure 2A:
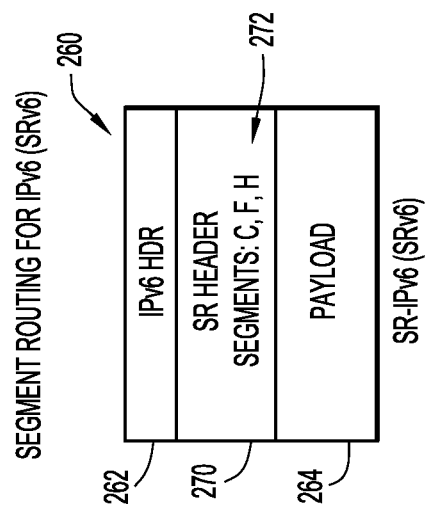
FIGS. 2A-2D are illustrative block diagrams of communication networks operative to route communications with use of segment routing (SR) and, in particular, with use of SR for IPv6 (SRv6)
Figure 2A:
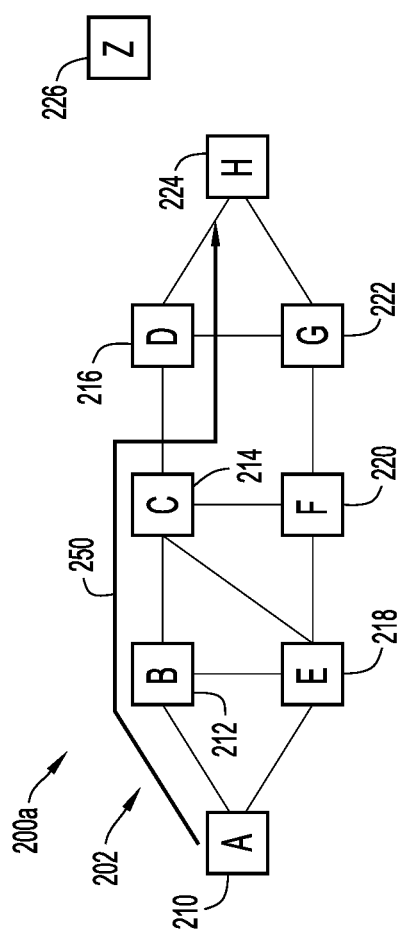

With reference first to FIG. 2A, a network 200a which includes a plurality of nodes 202 (e.g. routers, servers, base stations, gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
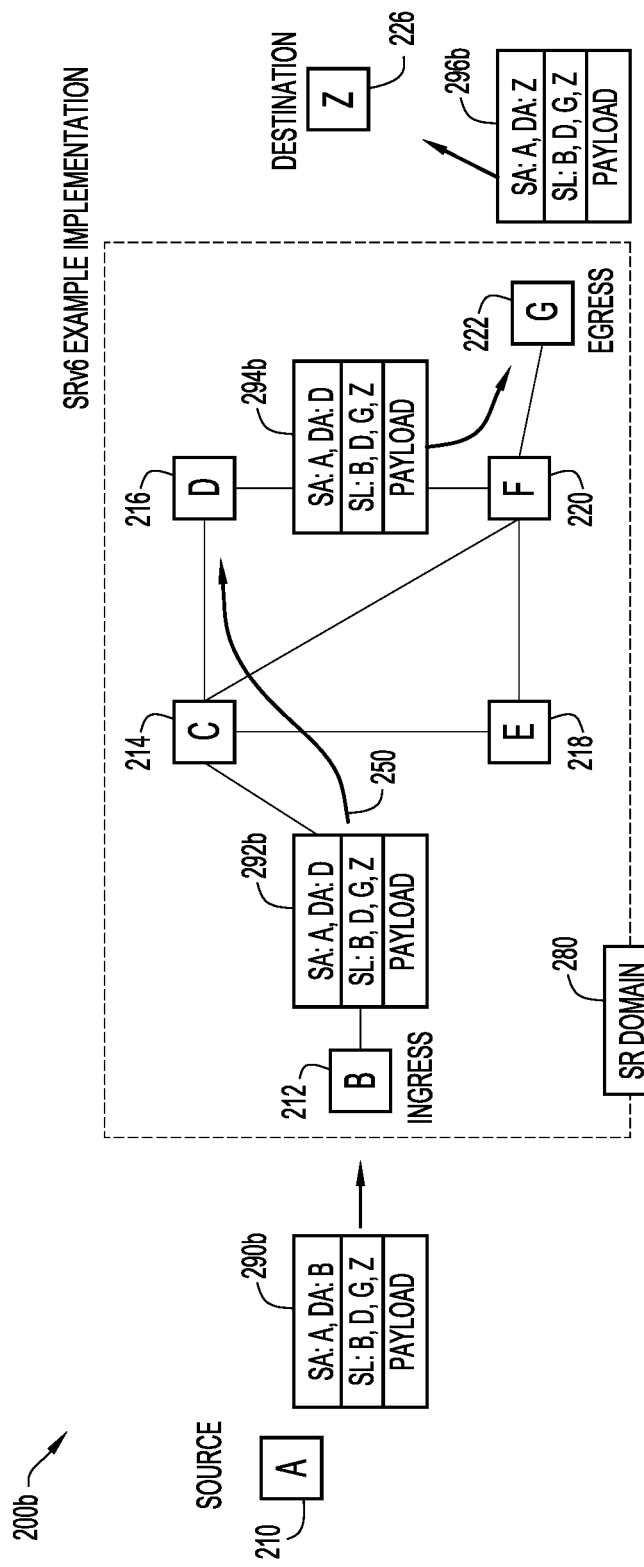

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290b. Here, the SR header of SR-IPv6 packet 290b includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
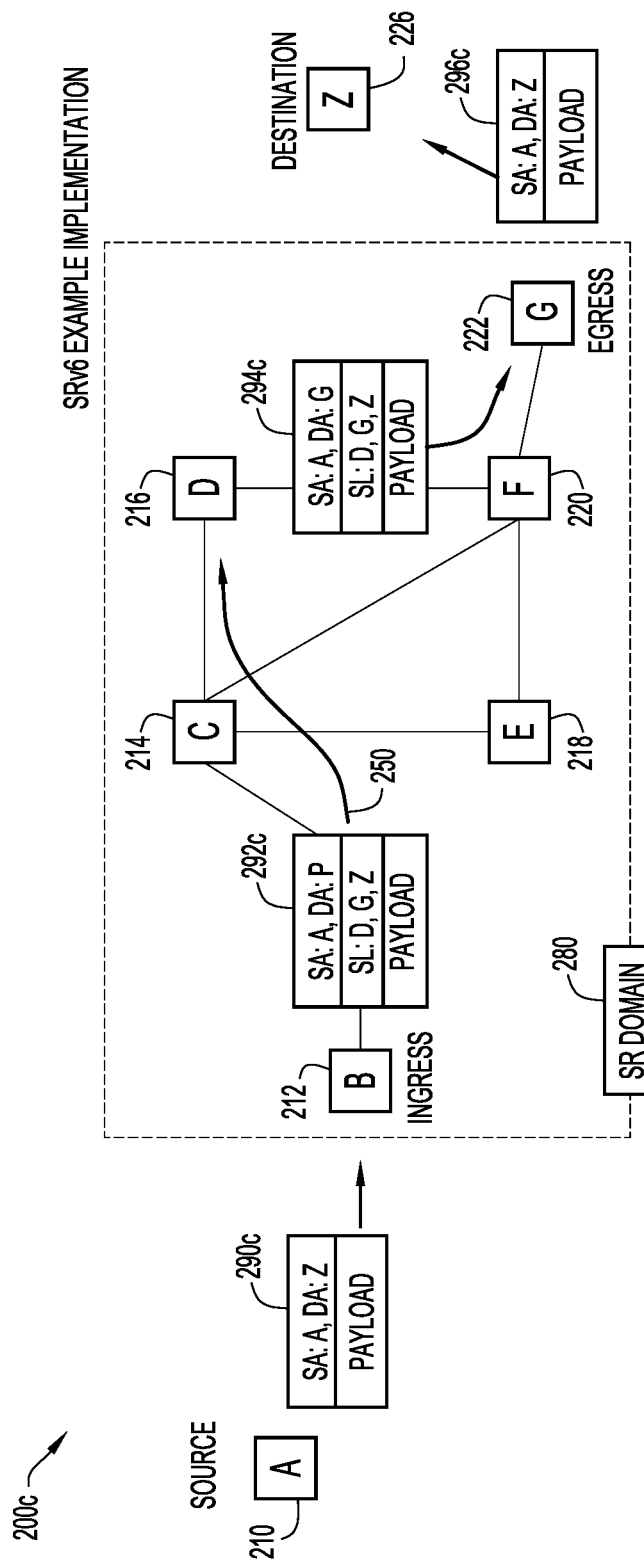

In the example of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
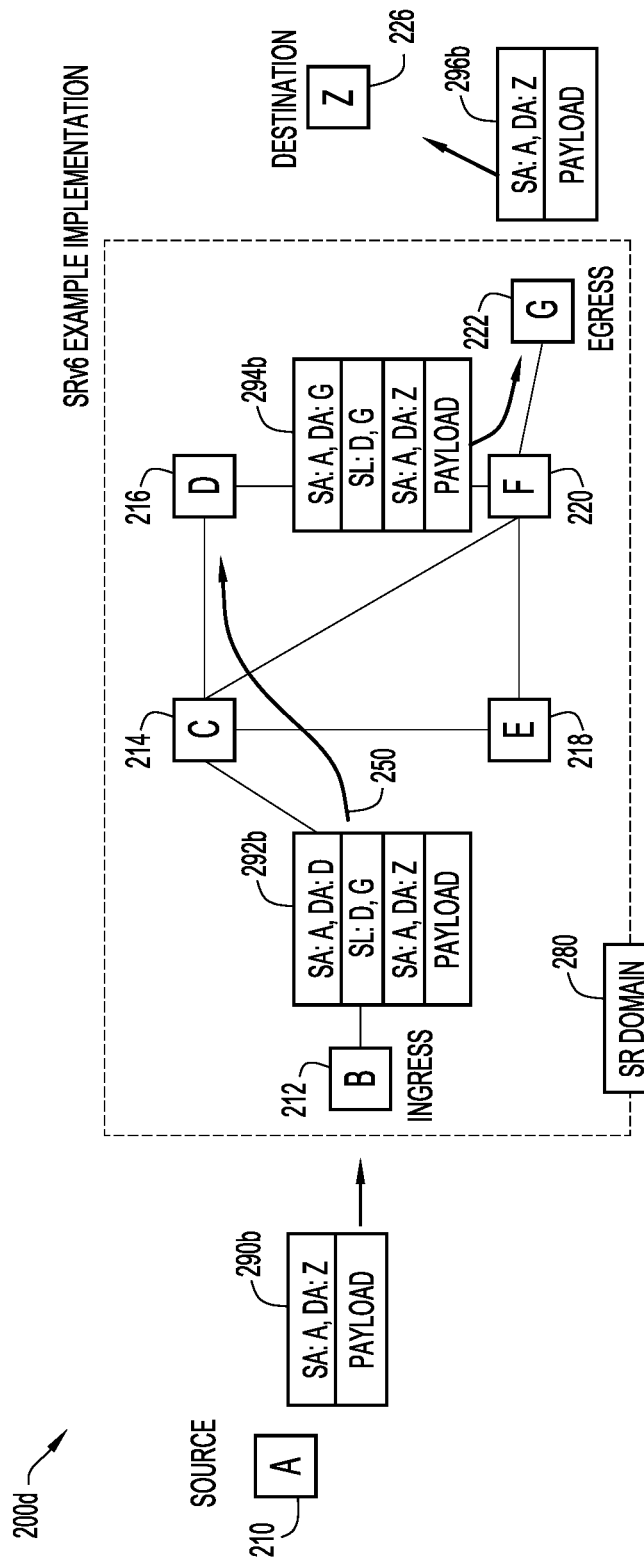

In the example of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

Note that the current state of the art for SRv6 is further described in various standards-related documents, including Internet Engineering Task Force (IETF) documents, and Internet-Drafts, such as "Segment Routing Architecture" identified by "draft-ietf-spring-segment-routing-14," C. Filsfils et al., Dec. 20, 2017; "IPv6 Segment Routing Header (SRH)" identified by "draft-ietf-6man-segment-routing-header-07," C. Filsfils et al., Jul. 20, 2017; and "SRv6 Network Programming" identified by "draft-filsfils-spring-srv6-network-programming-04," C. Filsfils et al., Mar. 4, 2018, each of which are hereby incorporated by reference as though fully set forth herein.

Figure 3:
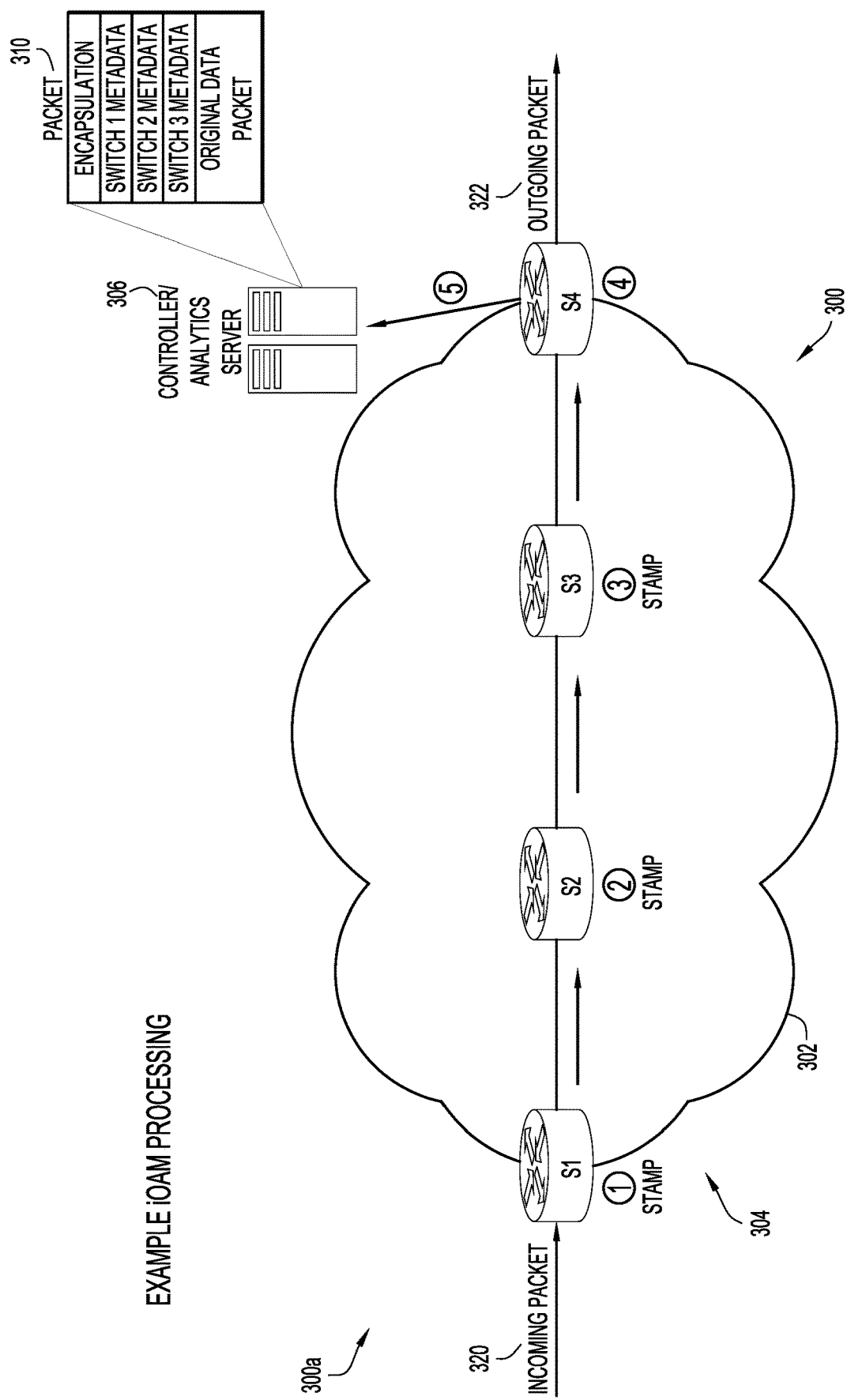
FIG. 3 is an illustrative representation of a network node arrangement of an SR network for describing an example of metadata or In-band Operations, Administration and Maintenance (iOAM) processing.

FIG. 3 is an illustrative representation of a network node arrangement 300a of an SR network 302 for describing an example of metadata or iOAM processing. The SR network 302 includes a plurality of switches 304 designated as S1, S2, S3, and S4, and a controller 306 (e.g. an analytics server). In this example, an incoming data packet 320 to the SR network 302 may be an SRv6 packet. The incoming data packet 320 may be received and stamped at S1 (switch 1 metadata), forwarded from S1 to be received and again stamped at S2 (switch 2 metadata), forwarded from S2 to be received and again stamped at S3 (switch 3 metadata), forwarded from S4 to be received at the controller for processing. An outgoing data packet 322 may leave the SR network 302. As indicated in FIG. 3, a packet 310 received at the controller 306 may include at least switch 1 metadata, switch 2 metadata, and switch 3 metadata in its header (e.g. SRH). If such metadata is carried in SRH TLVs of a customer data packet, the existing hardware in the switches S1, S2, and S3 may be unable to perform computationally-extensive TLV manipulation without adversely affecting performance associated with the packet (e.g. it may not be achievable at the line rate). Thus, such iOAM processing may potentially adversely affect the timing of the very stream being monitored and troubleshooted.

Figure 4A:
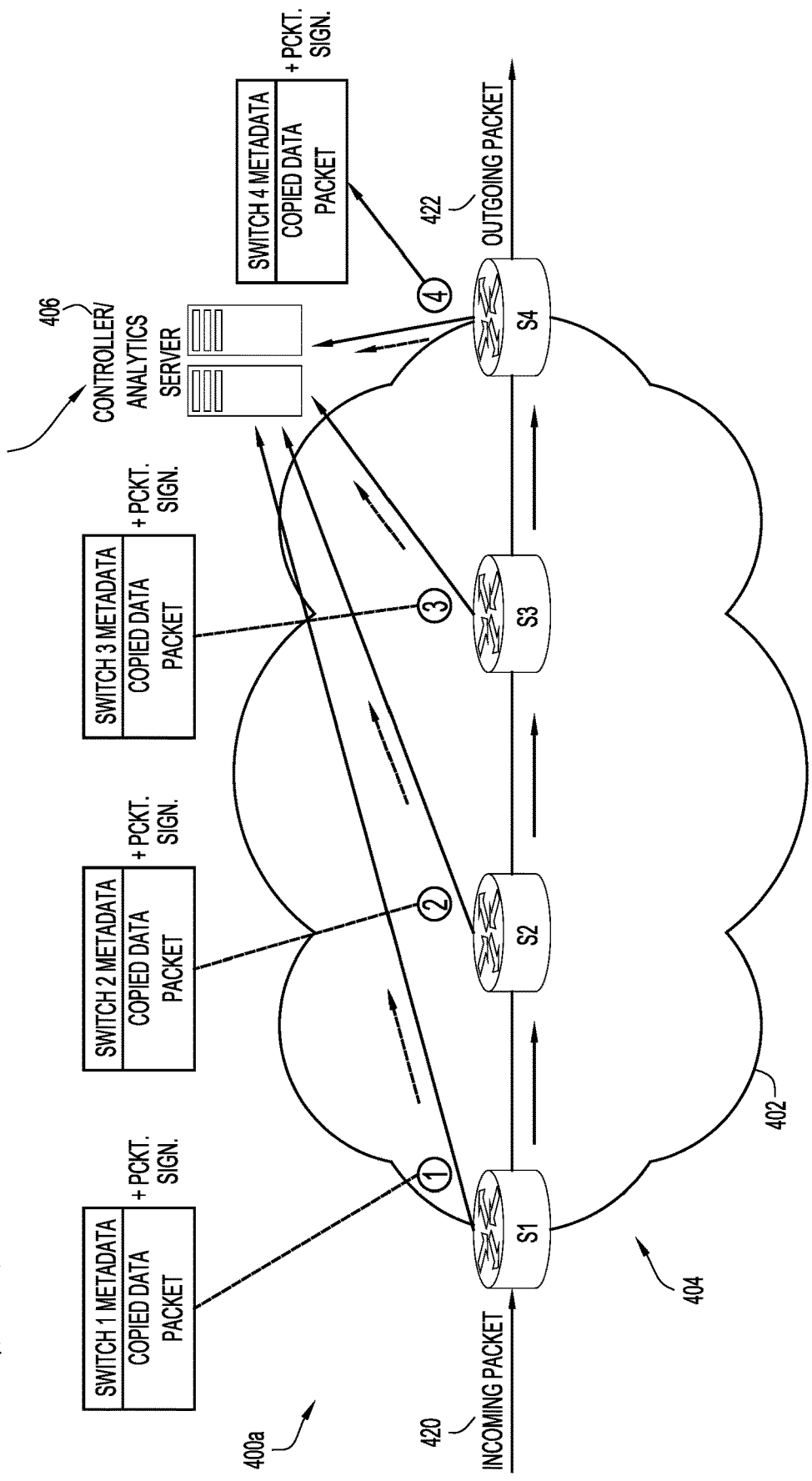
FIGS. 4A-4C are illustrative representations of a network node arrangement of an SR network for describing an example of metadata or iOAM processing according to some implementations of the present disclosure.

FIG. 4A is an illustrative representation of a network node arrangement 400a of an SR network 402 for describing an example of metadata or iOAM processing according to some implementations of the present disclosure. The SR network 402 includes a plurality of switches 404 designated as S1, S2, S3, and S4, and a controller 406 (e.g. an analytics server). In this example, an incoming data packet 420 to the SR network 402 may be an SRv6 packet. The incoming data packet 420 may be received at S1, where a stamped copy of the packet (e.g. stamped with a timestamp or other metadata) may be sent (e.g. telemetered) to controller 406 from S1 with a signature inserted with the packet copy. The original data packet (e.g. without any S1 stamping of iOAM data) may be forwarded from S1 to be received at S2, where a stamped copy of the packet (e.g. stamped with a timestamp or other metadata) may be sent (e.g. telemetered) to controller 406 from S2 with a signature inserted with the packet copy. The original data packet (e.g. without any S1 and/or S2 stamping of iOAM data) may be forwarded from S2 to be received at S3, again where a stamped copy of the packet (e.g. stamped with a timestamp or other metadata) may be sent (e.g. telemetered) to controller 406 from S3 with a signature inserted with the packet copy. The original data packet (e.g. without any S1, S2, and/or S3 stamping of iOAM data) may be forwarded from S3 to be received at S4, again where a stamped copy of the packet (e.g. stamped with a timestamp or other metadata) may be sent (e.g. telemetered) to controller 406 from S4 with a signature inserted with the packet copy. An outgoing data packet 422 (e.g. without any S1, S2, S3, and/or S4 stamping of iOAM data) may leave the SR network 402.

In FIG. 4A, processing associated with producing a stamped copy of the original data packet (e.g. stamped with a timestamp or other metadata) for communication to the controller may involve a function for "punting a stamped copy and forwarding." As an alternative, the processing associated with producing the stamped copy of the original data packet may involve a function for "forwarding and punting a stamped copy" instead of the "punting a stamped copy and forwarding." The latter technique makes it easier for device hardware to implement. The function to "forward and punt a time-stamped copy of the packet" processes the packet without head-of-line blocking in switching the packet, and hence is more efficient and hardware-friendly.

Regarding the above, a network node may process a packet at one of a plurality of different switching method levels. "Punting" may be characterized or viewed as an action by an interface's device driver of sending a packet "down" to the next lower switching level for communication. As one specific example, a list of switching method levels or paths in order from fastest to slowest may be as follows: (1) a distributed express-forwarding of a packet with use of a hardware application-specific integrated circuit (ASIC); (2) a (non-distributed) express forwarding of a packet with use of the hardware ASIC; (3) a fast switching; and (4) a process switching. The first two switching method levels ("fast paths") make use of hardware ASICs in the devices, but others may make use of a slower path in software associated with a route processor (RP) CPU.

At the controller 406 of FIG. 4A, some or all of the copied data packets with iOAM stampings and signatures may be received, and these copied data packets and/or metadata may be grouped together or correlated based on the signatures (e.g. analytics is performed on the received copies having the same signature).

Figure 4B:
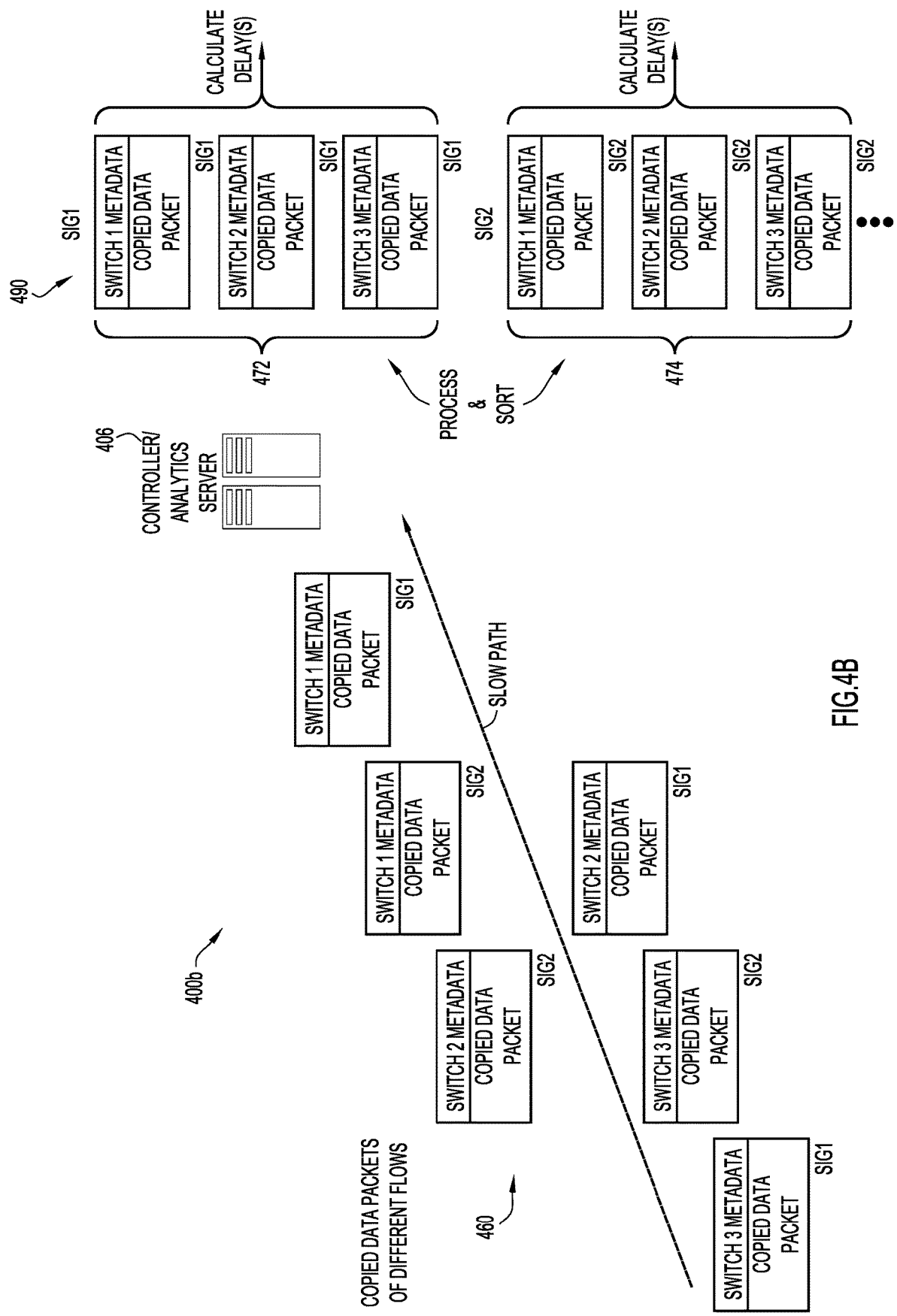

To better illustrate with reference to a network node arrangement 400b of FIG. 4B, a plurality of stamped data packet copies 460 of various data packets may be telemetered or otherwise sent to controller 406. These data packet copies 460 may be received at controller 406 in a scattered or arbitrary fashion. Each one of the stamped data packet copies 460 includes a signature, where each signature is uniquely associated with a corresponding original data packet. Controller 406 may perform processing and sorting of the data packet copies 460 in a plurality of logical or physical groupings 490 of data packet copies based on the signatures. Here, each stamped data packet copy may be correlated with one or more other stamped data packet copies of the data packet from one or more other network nodes having the same signature. In FIG. 4B, the plurality of groupings 490 include a grouping 472 for "signature 1" data packets and a grouping 474 for "signature 2" data packets. In some implementations, controller 406 may use the sending network node's address (e.g. IP address) or other identification to perform such analysis and computation.

Figure 4C:
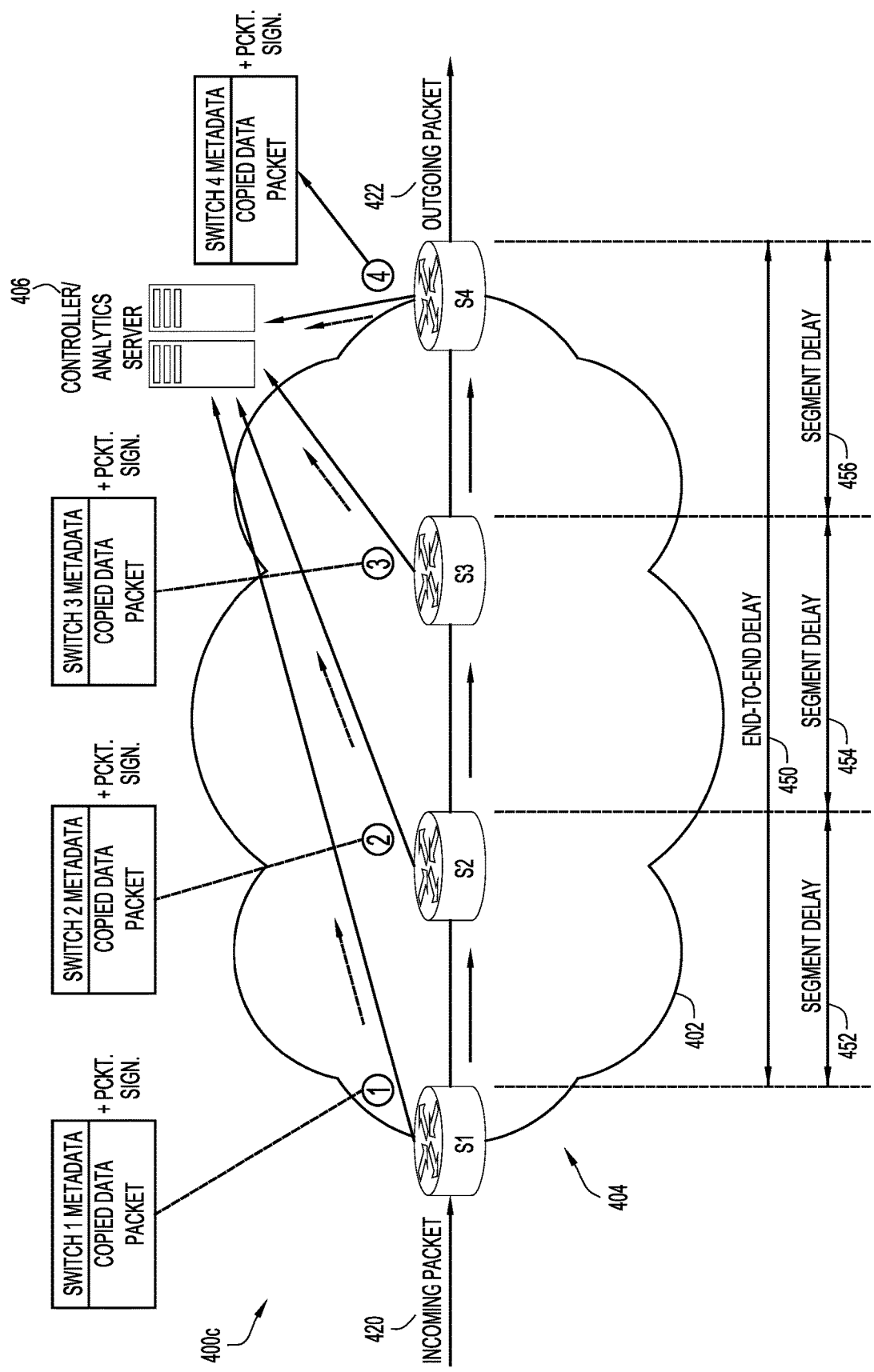

At the controller 406, one or more delay measurements associated with the data packet may be computed based on timestamps of the correlated timestamped data packet copies. As illustrated in a network node arrangement 400c of FIG. 4C, controller 406 may compute an end-to-end delay measurement 450 between ingress and egress nodes, and/or one or more segment delay measurements 452, 454, 456 between network nodes.

FIGS. 5A, 5B, and 5C are illustrative representations of stamped copies 500a, 500b, and 500c, respectively, of an original data packet which has traversed a plurality of routers or switches (e.g. S1, S2, and S3 of FIGS. 4A-4C), where the stamped copies may be forwarded to a controller for iOAM processing, according to some implementations. In FIG. 5A, the message format 500a of the copied data packet includes a header 502a (e.g. a local or punt header) and a payload 504a which may include payload data. Header 502a may include router- or switch-added data 510a (i.e. data that are added to or inserted in the header 502a by the router or switch) which may be referred to as iOAM data. More specifically in FIG. 5A, header 502a may include a timestamp "1" ($TS_1$) (and/or other iOAM data) which is stamped at the router/switch S1. In FIG. 5B, the message format 500b of the copied data packet includes a header 502b (e.g. a local or punt header) and a payload 504b which may include payload data. Header 502b may include router- or switch-added data 510b (i.e. data that are added to or inserted in the header 502b by the router or switch) which may be referred to as iOAM data. More specifically in FIG. 5B, header 502b may include a timestamp "2" ($TS_2$) (and/or other iOAM data) which is stamped at the router/switch S2. In FIG. 5C, the message format 500c of the copied data packet includes a header 502c (e.g. a local or punt header) and a payload 504c which may include payload data. Header 502c may include router- or switch-added data 510c (i.e. data that are added to or inserted in the header 502c by the router or switch) which may be referred to as iOAM data. More specifically in FIG. 5C, header 502c may include a timestamp "3" ($TS_3$) (and/or other iOAM data) which is stamped at the router/switch S3.

Also as indicated in FIGS. 5A, 5B, and 5C, data that are used for a (unique) signature corresponding to the (original) data packet may include or be based on at least a portion of the payload data. Each signature may be inserted in the corresponding header 502a, 502b, or 502c (i.e. the local or punt header). The signatures associated with these copied data packets for the same data packet are the same. In some implementations, each signature may be or based on a cyclical redundancy check (CRC) or a hash of the at least portion of the payload. These data packet copies with iOAM stampings and signature data may be received at the controller, where the data packet copies and/or metadata (e.g. timestamps) are grouped together or correlated based on the signatures (e.g. analytics is performed on the received copies having the same signatures).

Figure 6A:
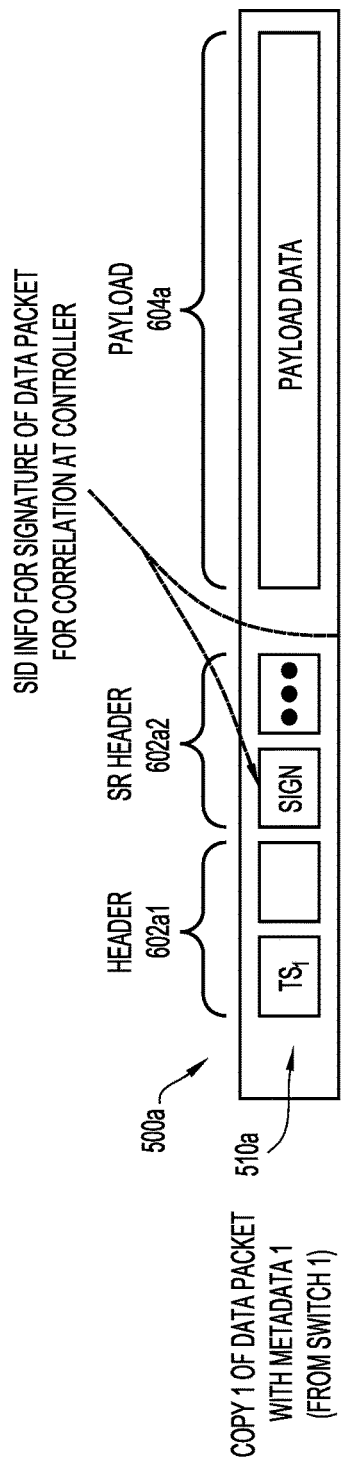
FIGS. 6A-6C are illustrative representations of stamped copies of an original data packet which has traversed a plurality of routers or switches (e.g. S1, S2, and S3 of FIG. 4A), where the stamped copies with Segment ID (SID) based signatures may be forwarded to a controller for metadata or iOAM processing, according to some implementations.
Figure 6B:
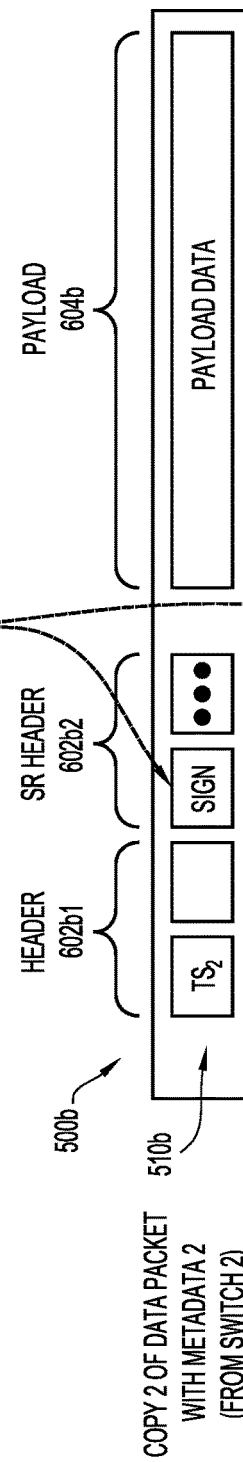
Figure 6C:
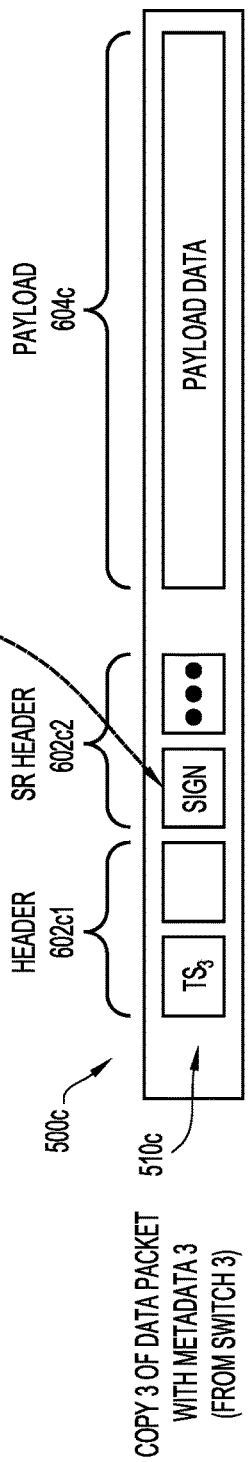

FIGS. 6A, 6B, and 6C are illustrative representations of stamped copies 600a, 600b, and 600c, respectively, of an original data packet which has traversed a plurality of routers or switches (e.g. S1, S2, and S3 of FIGS. 4A-4C), where the stamped copies may be forwarded to a controller for iOAM processing, according to some implementations. The stamped copies of the data packet of FIGS. 6A-6C are substantially the same as those described in relation to FIGS. 5A-5C, except that the data that are used for a (unique) signature corresponding to the (original) data packet may be included as segment ID (SID) information in an SRH header.

More specifically, in FIG. 6A, a message format 600a of the copied data packet includes a header 602a1 (e.g. a local or punt header), a header 602a2 (e.g. an SRH), and a payload 604a which may include payload data. Header 602a1 may include the router- or switch-added data 510a (i.e. data that are added to or inserted in the header 602a1 by the router or switch) which may be referred to as iOAM data, and header 602a2 which is the SRH may include SID information corresponding to the signature. More specifically in FIG. 6A, header 602a1 may include a timestamp "1" ($TS_1$) (and/or other iOAM data) which is stamped at the router/switch S1. In FIG. 6B, the message format 600b of the copied data packet includes a header 602b1 (e.g. a local or punt header), a header 602b2 (e.g. an SRH), and a payload 604b which may include payload data. Header 602b1 may include the router- or switch-added data 510b (i.e. data that are added to or inserted in the header 602b1 by the router or switch) which may be referred to as iOAM data, and header 602b2 which is the SRH may include SID information corresponding to the signature. More specifically in FIG. 6B, header 602b1 may include a timestamp "2" ($TS_2$) (and/or other iOAM data) which is stamped at the router/switch S2. In FIG. 6C, the message format 600c of the copied data packet includes a header 602c1 (e.g. a local or punt header), a header 602c2 (e.g. an SRH), and a payload 604c which may include payload data. Header 602c1 may include the router- or switch-added data 510c (i.e. data that are added to or inserted in the header 602c1 by the router or switch) which may be referred to as iOAM data, and header 602c2 which is the SRH may include the SID information corresponding to the signature. More specifically in FIG. 6C, header 602c1 may include a timestamp "3" ($TS_3$) (and/or other iOAM data) which is stamped at the router/switch S3. The signatures associated with these copied data packets may be the same. Again, these data packet copies with iOAM stampings and signature data may be received at the controller, where the data packet copies and/or metadata (e.g. timestamps) may be grouped together or correlated based on the signatures (e.g. analytics is performed on the received copies having the same signatures).

Figure 7A:
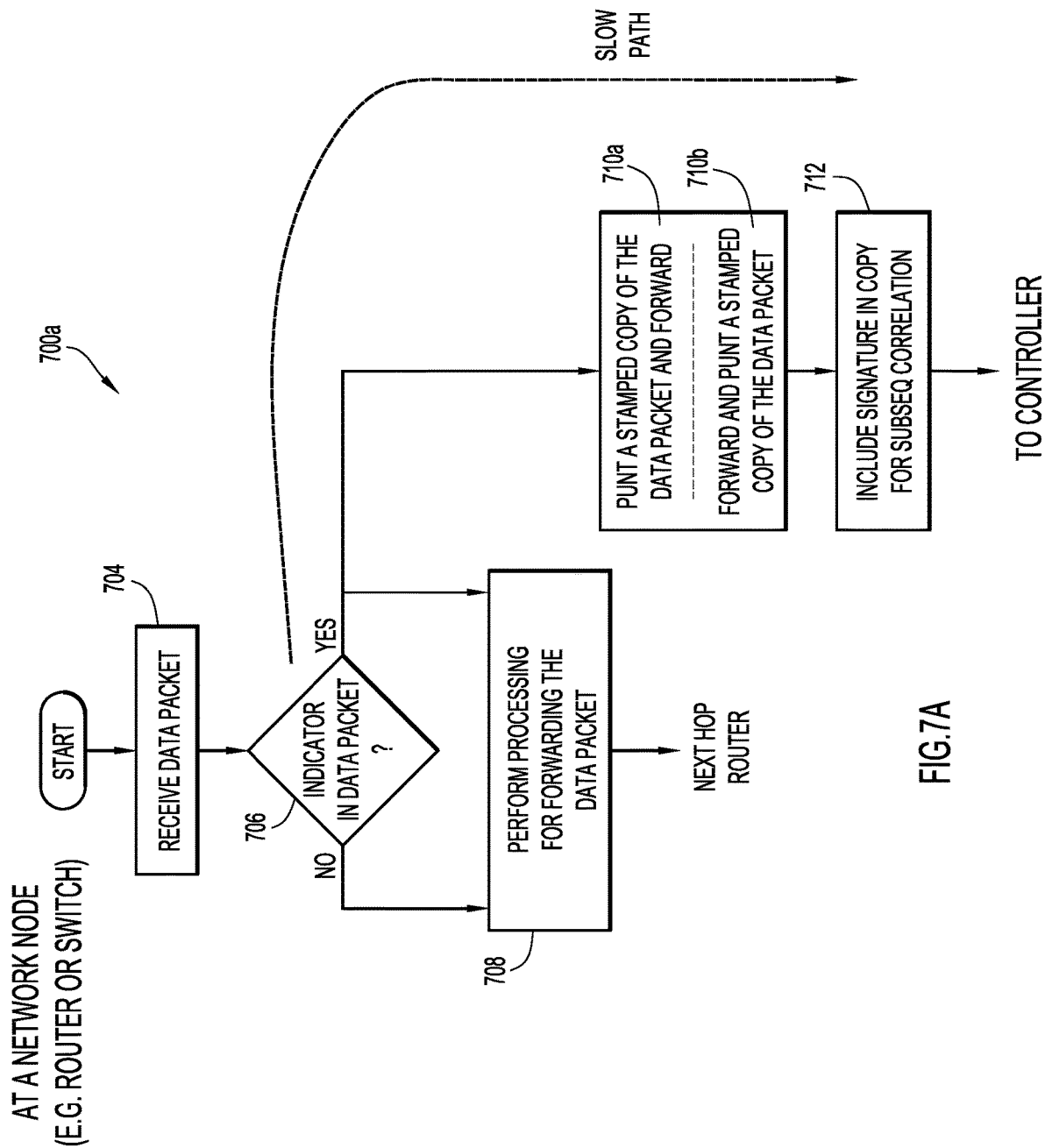
FIG. 7A-7B are flowcharts for describing methods of metadata or iOAM processing according to some implementations of the present disclosure, which may be performed at a network node, such as a router or switch (e.g. S1, S2, S3, and/or S4 of FIG. 4A)

FIG. 7A is a flowchart 700a for describing a method of metadata or iOAM processing according to some implementations of the present disclosure. The method of FIG. 7A may be performed at a network node, such as a router or switch (e.g. S1, S2, and/or S3 of FIG. 4B). The network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block of FIG. 7A, the network node may receive a data packet (step 704 of FIG. 7A). The network node may identify whether an indicator is included in a header of the packet (step 706 of FIG. 7A). This indicator may be, for example, a bit indicator (e.g. a predefined bit such as the 'O' bit) or a label indicator (e.g. a predefined label such as a predefined MPLS label). In alternative implementations, the indicator (and the detection thereof) is not needed, where the appropriate processing may be inferred based on other data. If the indicator is not identified in the header, then the network node may perform normal processing for forwarding the data packet to a next network node (step 708 of FIG. 7A). If the indicator is identified in the header, then the network node may still perform the processing for forwarding the data packet at step 708. Here, however, the network node may perform a function to punt a stamped copy of the data packet and forward (strep 710*a* of FIG. 7A), or alternatively perform a function to forward and punt a stamped copy of the data packet (step 710*b* of FIG. 7A). The network node may compute a signature corresponding to the original data packet and insert the signature into a header of the stamped data packet copy (step 712 of FIG. 7A). The signature may be used by the controller to group together or correlate the data packet copies of the original data packet for processing of the metadata (e.g. timestamps).

Figure 7B:
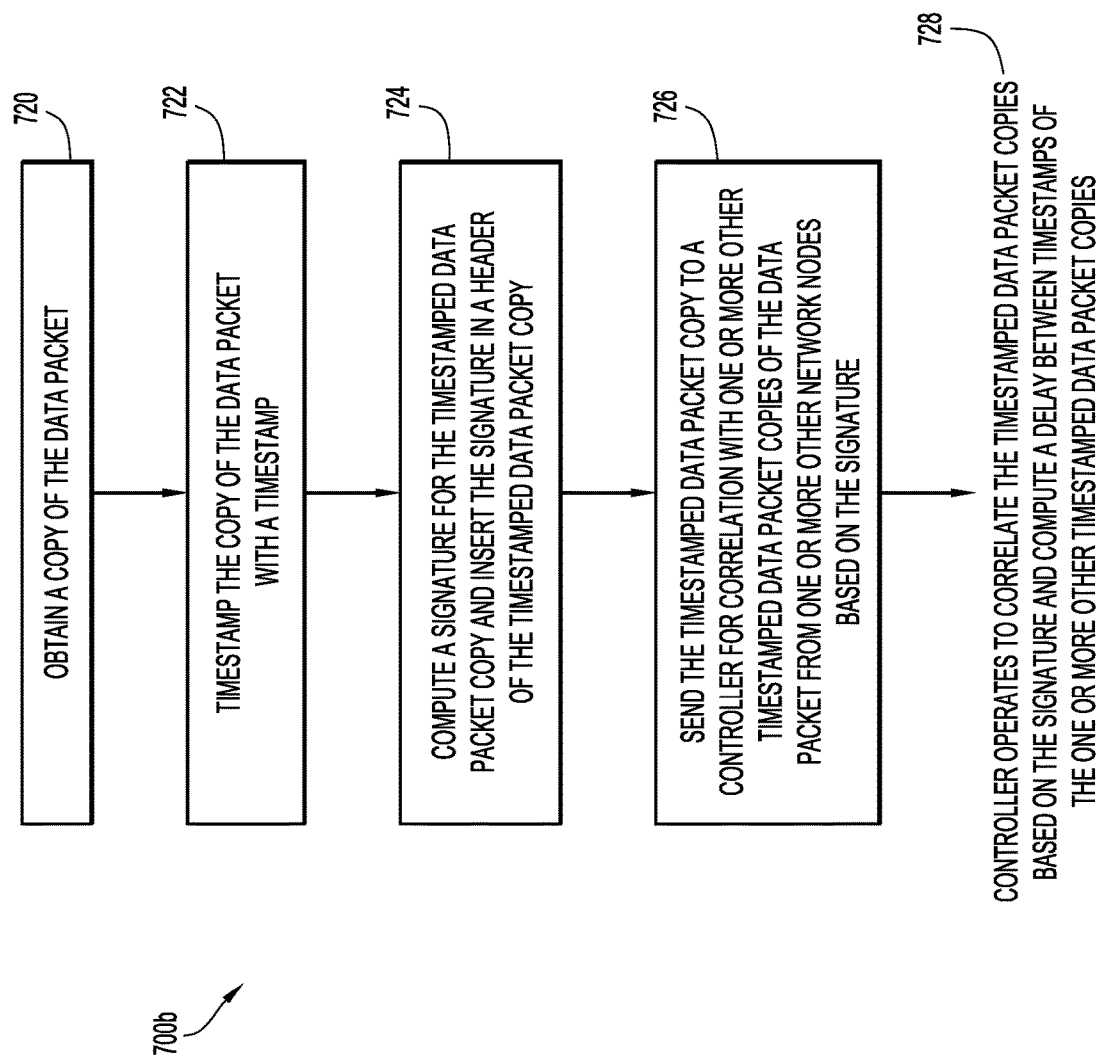

FIG. 7B is a flowchart 700*b* for describing a method of metadata or iOAM processing according to some implementations of the present disclosure. The method of FIG. 7A may be performed at a network node, such as a router or switch (e.g. S1, S2, and/or S3 of FIG. 4B). In some implementations, the steps in FIG. 7B may be performed as part of steps 710 and 712 of FIG. 7A (i.e. performed as part of the punting-related steps).

In FIG. 7B, a network node (e.g. a router or switch) may receive a data packet and produce or otherwise obtain a copy of the data packet (step 720 of FIG. 7B). The network node may timestamp the data packet copy with a timestamp (step 722 of FIG. 7B). The network node may also compute a signature for the timestamped data packet copy and insert the signature in a header of the timestamped data packet copy (step 724 of FIG. 7B). The network node may send the timestamped data packet copy to a controller for correlation with one or more other timestamped data packet copies of the data packet from one or more other network nodes having the same signature (step 726 of FIG. 7B). In these steps, the processing of the data packets may be performed as part of a function for punting the timestamped data packet copy and forwarding, or as a function for forwarding and punting the timestamped data packet copy. The original data packet may be forwarded to a next network node without any timestamp or other metadata added to it. At the controller, a delay associated with the data packet may be computed based on timestamps of the correlated timestamped data packet copies (controller processing step 728 of FIG. 7B).

In some implementations of step 724, the signature may be computed based on at least a portion of a payload of the data packet. The signature may be or based on a CRC or a hash of the at least portion of the payload of the data packet. In some implementations, the signature may be inserted as SID information in an SRH of an SRv6 packet.

Figure 8:
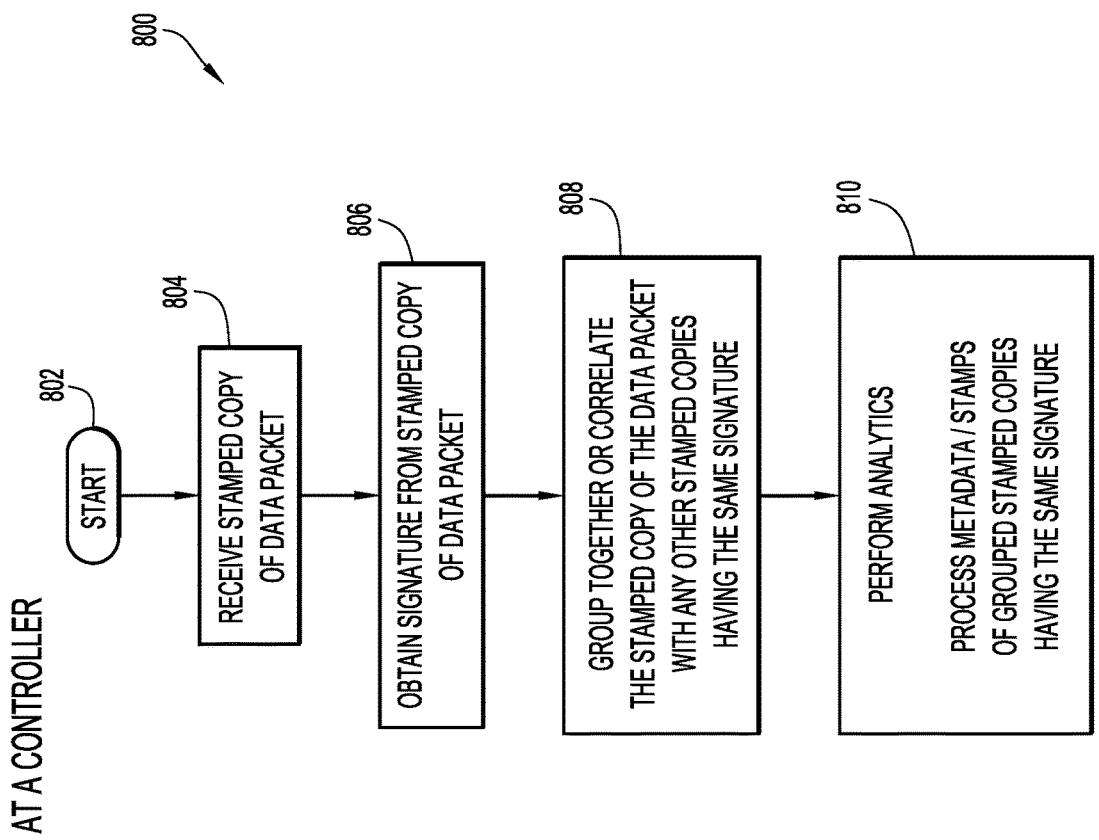
FIG. 8 is a flowchart for describing a method of metadata or iOAM processing according to some implementations of the present disclosure, which may be performed at a controller (e.g. the controller of FIG. 4A)

FIG. 8 is a flowchart for describing a method of metadata or iOAM processing according to some implementations of the present disclosure. The method of FIG. 8 may be performed at a controller (e.g. the controller of FIGS. 4A-4C), such as an SDN controller or other analytics function, such as an NWDAF. The controller may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of controller for performing the steps of the method.

Beginning at a start block of FIG. 8, the controller may receive from a network node a timestamped copy of a data packet that is forwarded from the network node to a next network node (step 804 of FIG. 8). The controller may obtain a signature from a header of the timestamped data packet copy (step 806 of FIG. 8). The controller may group together or otherwise correlate the timestamped data packet copy with one or more other received timestamped copies of the data packet from one or more other network nodes having the same signature as the timestamped data packet copy (step 808 of FIG. 8). The controller may perform analytics with respect to the timestamps and/or other metadata (step 810 of FIG. 8). Here, the controller may compute a delay of the data packet between network nodes based on timestamps of the correlated timestamped data packet copies. The controller may also use the sending network node's address (e.g. IP address) or other identification to perform such analysis and computation.

With respect to the data packet copies received from the network nodes (e.g. step 804), the processing of data packets at the network nodes may involve a function for punting the timestamped data packet copy and forwarding, or as a function for forwarding and punting the timestamped data packet copy, as described earlier, where the original data packet is forwarded to the next network node without any timestamp or other metadata being added to it.

In some implementations of FIG. 8, the signature used for correlation may be computed based on at least a portion of a payload of the data packet. The signature may be or based on a CRC or a hash of the at least portion of the payload of the data packet. In some implementations, the signature may be inserted as SID information in an SRH of an SRv6 packet. In other implementations of FIG. 8, a characteristic of the copied data packet other than a signature is used for correlation at the controller.

According to some implementations described herein, a controller (e.g. an SDN controller) may initiate analysis with respect to in-band segment-by-segment or end-to-end delay encountered by customer traffic associated with a flow or steered via an SR policy. During observation of customer traffic as it travels through an SR network, techniques of the present disclosure need not insert or carry any OAM metadata in the packet.

In some implementations, the technique may rely on the "O-bit" in SRH to instruct "punt a time-stamped copy of the packet and forward" or "forward and punt a time-stamped copy of the packet" behavior. In SR-MPLS implementations, the use of a "sampling label" or "GAL/GAch labels" to instruct a "punt a time-stamped copy of the packet and forward" or "forward and punt a time-stamped copy of the packet" behavior. The punted copy of the packets may be timestamped in hardware. The punted packets may be processed in the "slow path" and telemetered to the SDN controller. The end-to-end or segment-by-segment delays may be computed at the SDN controller. A proof-of-transit may also be established at the SDN controller.

Specific techniques are now described further below (e.g. elaborating or providing alternatives to the operation described in relation to FIGS. 4, 5A-5C, 6A-6C, 7, and 8), in relation to specific processing at the different nodes as well as the controller.

Figure 9A:
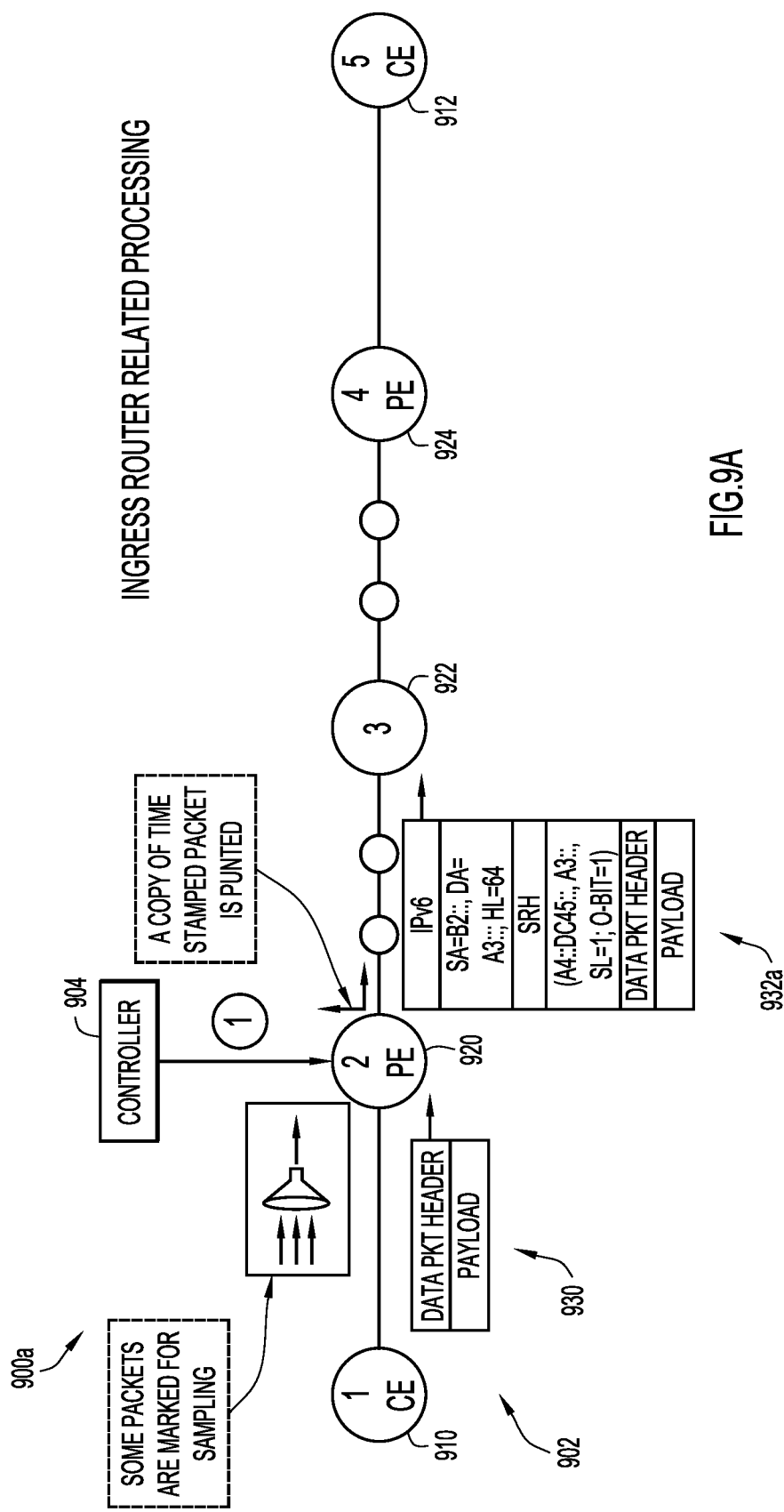
FIGS. 9A-9C are network node diagrams for describing metadata or iOAM processing in relation to an ingress node according to some implementations.

FIG. 9A is a network node arrangement 900*a* for describing metadata or iOAM processing in relation to an ingress node in a communication network according to some implementations. In FIG. 9A, the communication network may include a plurality of network nodes 902 (e.g. routers, switches) which may be in communication with a controller

904. Network nodes 902 may include (in order from left to right) a customer edge (CE) router 910, a provider edge (PE) router 920, a router 922, a PE router 924, and a CE router 912. PE router 920 may be referred to as the ingress node.

In-band OAM may be enabled for a particular flow or a policy. Matching to these flows may be based on incoming flow identifiers or based on steering into an SR policy. Incoming packets may be matched and "sampled" for in-band OAM. In FIG. 9A, the controller 904 may initiate measurement for in-band segment-by-segment or end-to-end delay encountered by customer traffic associated with a flow or steered via an SR policy (indicated at an instruction process "1" in FIG. 9A). Here, the ingress router (i.e. PE router 920) may receive an incoming data packet 930. For the packets that are internally marked for sampling, the O-bit may be set in the inserted SRH (to instruct sampling at the egress node), as indicated in an outgoing data packet 932a. The data-plane may follow a "punt a time-stamped copy of the packet and forward" or a "forward and punt a time-stamped copy of the packet" behavior. No metadata is or needs to be carried in the forwarded packet (forwarded packet is not manipulated), as shown in the outgoing data packet 932a. Controller 904 may receive a timestamped copy of some of these sampled packets from PE router 920 (i.e. the ingress), PE router 924 (i.e. the egress), and each segment node (e.g. router 922). The controller 904 may correlate copied data packets from other network nodes based on signatures uniquely corresponding to the original data packet. The controller 904 may key or sort the copied data packets based on the signature and perform analytics (e.g. compute delay measurements).

Figure 9B:
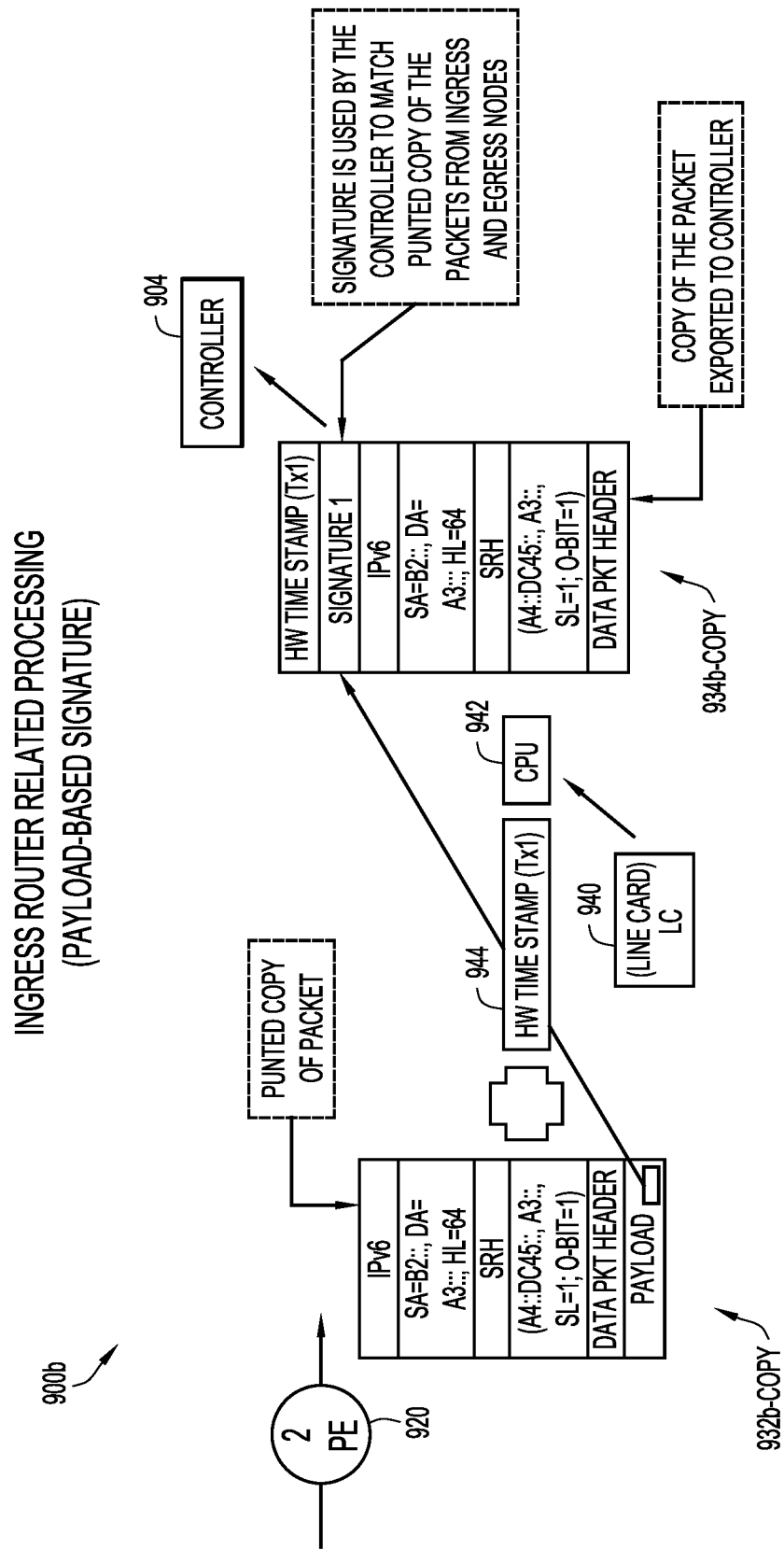

FIG. 9B is a network node diagram for describing metadata or iOAM processing in relation to the ingress node of FIG. 9A, which includes driving a packet signature in the slow path according to some implementations. A data packet copy 932b-copy ("punted copy") may be obtained. A hardware timestamp 944 (T×1) may also be obtained (e.g. from a line card or "LC" 940) and provided in a punt header of the data packet copy. The slow path may take data packet copy 932b-copy with hardware timestamp (T×1), where a CPU 942 may compute a signature of the packet and insert it in the punt header with the hardware timestamp (T×1), as shown in a data packet copy 934b-copy.

In some implementations, the signature may be derived based on at least a portion of the payload. For example, the signature may be derived from four (4) bytes of data at the tail end of the payload (or other offset and/or chunk-size of data). In some other implementations, the signature may be or include a CRC or a type of hash or secure hash algorithm (SHA). Both the ingress and egress nodes may use the same logic or function in computing the signature. The signature of the packet is used by the controller to correlate copy of the same packet independently sent by the ingress and the egress nodes. No metadata needs to be added to the original data packet.

Figure 9C:
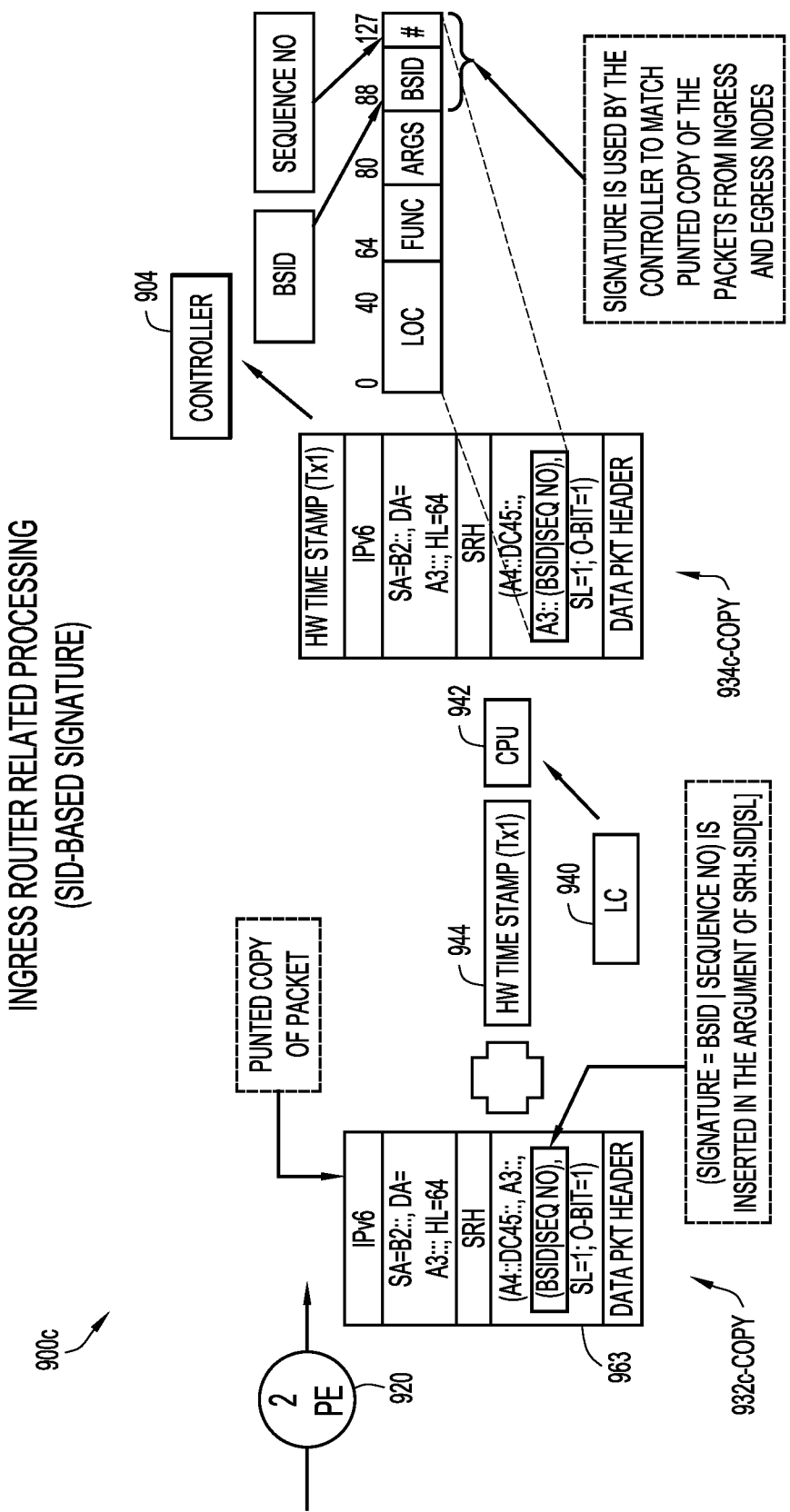

FIG. 9C is a network node diagram for describing metadata or iOAM processing in relation to an ingress node, with use of a SID-based signature according to some implementations. This procedure may be complementary to driving the signature from the packet payload itself. This procedure may use SID information, and may be very hardware-efficient as it does not need to employ any TLV manipulation. The SID function may accessible in the hardware and operation to drive the signature may be performed when the SID is being accessed by the data-plane.

Again, a data packet copy 932c-copy ("punted copy") may be obtained. The hardware timestamp 944 (T×1) may also be obtained (e.g. from the LC 940) and provided in a punt header of the copy. Here, the fast path may insert (signature=BSID|Sequence Number) in the argument of SRH.SID[SL]—48 bits. This may use SRH encoding without the .REDUCE function. The slow path may receive the punted copy with the hardware timestamp (T×1) and signature, where CPU 942 may export the copy (i.e. a data packet copy 934c-copy) to controller 904 in accordance with streaming telemetry or, alternatively, netflow export may be used. Note that since the information is encoded in the argument of the SID, the SID value may still be used for any other purpose (e.g., SRH reversal, etc.)

As described previously, in SRv6 Network Programming (draft-filsfils-spring-srv6-network-programming-04), the SRH.Flags.O-bit may be used to instruct a "punt a time-stamped copy of the packet and forward" behavior. This feature may be extended to include a "forward and punt a time-stamped copy of the packet" behavior as it is easier for the hardware to implement. The "forward and punt a time-stamped copy of the packet" processes the packet without head-of-line blocking in switching the packet, and hence is more efficient and hardware-friendly. Thus, the SRH-.Flags.O-bit may be used to instruct a "Punt a Timestamped Copy and Forward" behavior or a "Forward and Punt a Timestamped Copy" behavior.

Figure 10A:
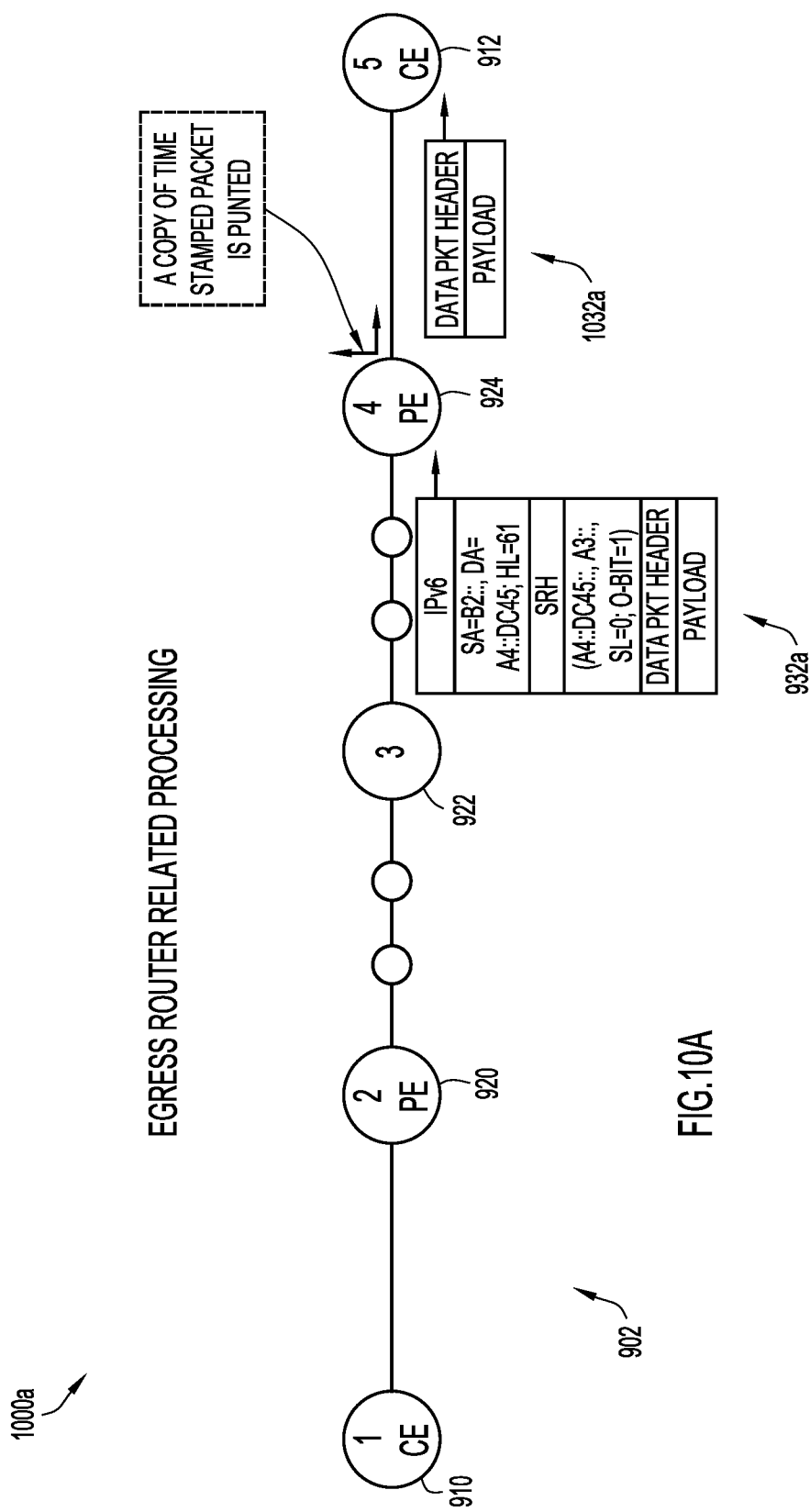
FIG. 10A-10C is a network node diagram for describing metadata or iOAM processing in relation to an egress node according to some implementations.

FIG. 10A is a network node arrangement 1000a for describing metadata or iOAM processing in relation to an egress node in a communication network according to some implementations. PE router 924 may be referred to as the egress node. At the egress node, data packet 932a may arrive with the SRH.Flags.O=1. If SRH.Flags.O-bit=1, the egress node may implement a "Punt a Timestamped Copy and Forward" behavior or a "Forward and Punt a Timestamped Copy" behavior with respect to this data packet 932a. A hardware-based timestamp may be inserted in a punt header of the punted copy of the packet, and the timestamped punted copy may be sent to the controller together with the inserted signature. With respect to the original data packet, the egress router may operate to remove the SRH, and the resulting packet may be forwarded to the CE router 912 as a data packet 1032a as shown.

Figure 10B:
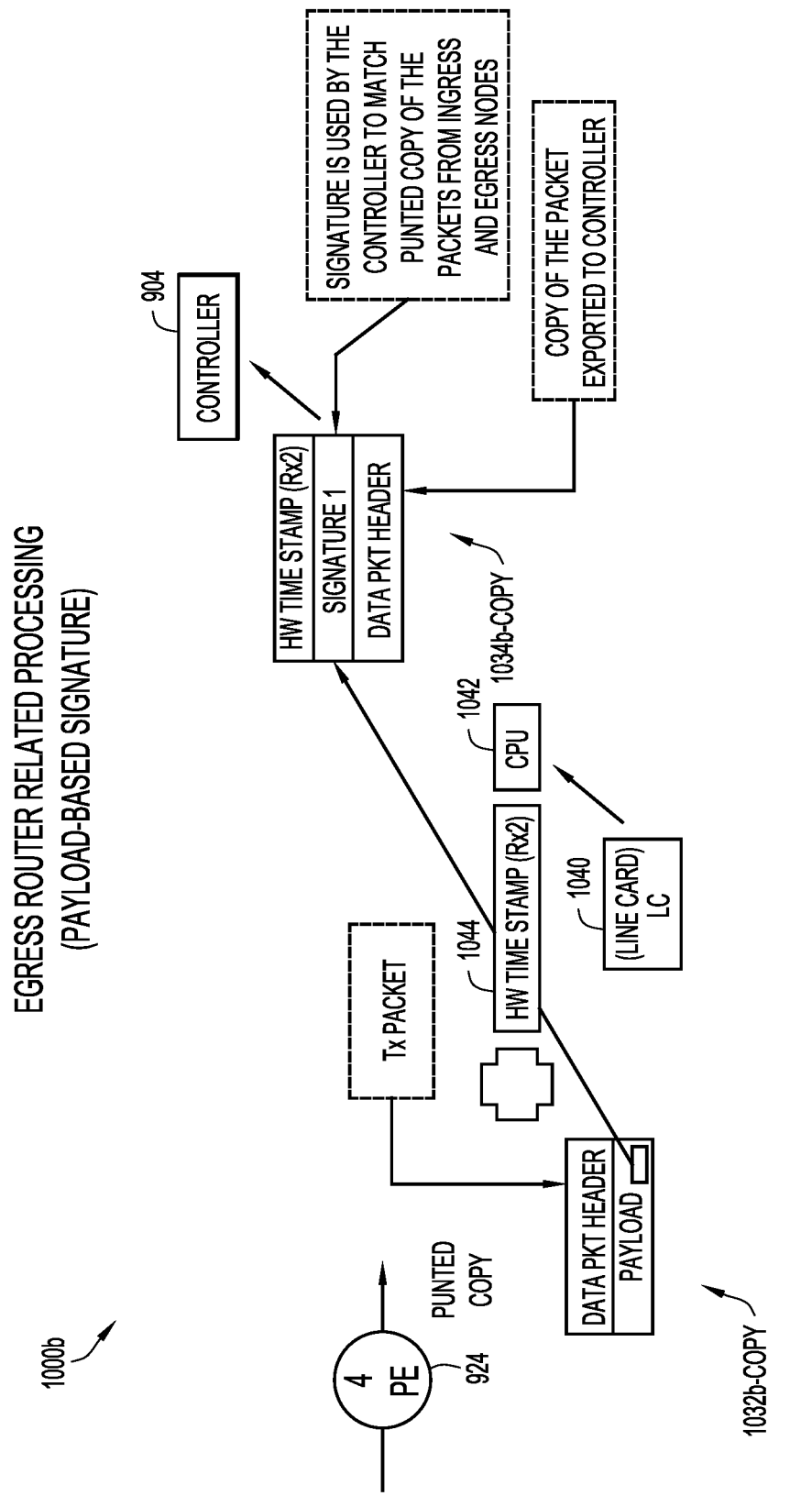

FIG. 10B is a network node diagram for describing metadata or iOAM processing in relation to an egress node, with driving a packet signature in the slow path according to some implementations. The procedure is the same or substantially the same as observed by the ingress node (and segment nodes). A data packet copy 1032b-copy ("punted copy") may be obtained. A hardware timestamp 1044 (R×2) may also be obtained (e.g. from a line card or "LC" 1040) and provided in a punt header of the data packet copy. The slow path may take data packet copy 1032b-copy with hardware timestamp (R×2), where a CPU 1042 may compute a signature of the packet and insert it in the punt header with the hardware timestamp (R×2), as shown in a data packet copy 1034b-copy. The same logic used by the ingress/segment nodes is applied to compute the signature of the packet (e.g. apply the same CRC). Note that the diagram of FIG. 10B assumes the "Forward and Punt a Timestamped Copy" behavior; however, the procedure is equally applicable to a "Punt a Timestamped Copy and Forward" behavior.

Figure 10C:
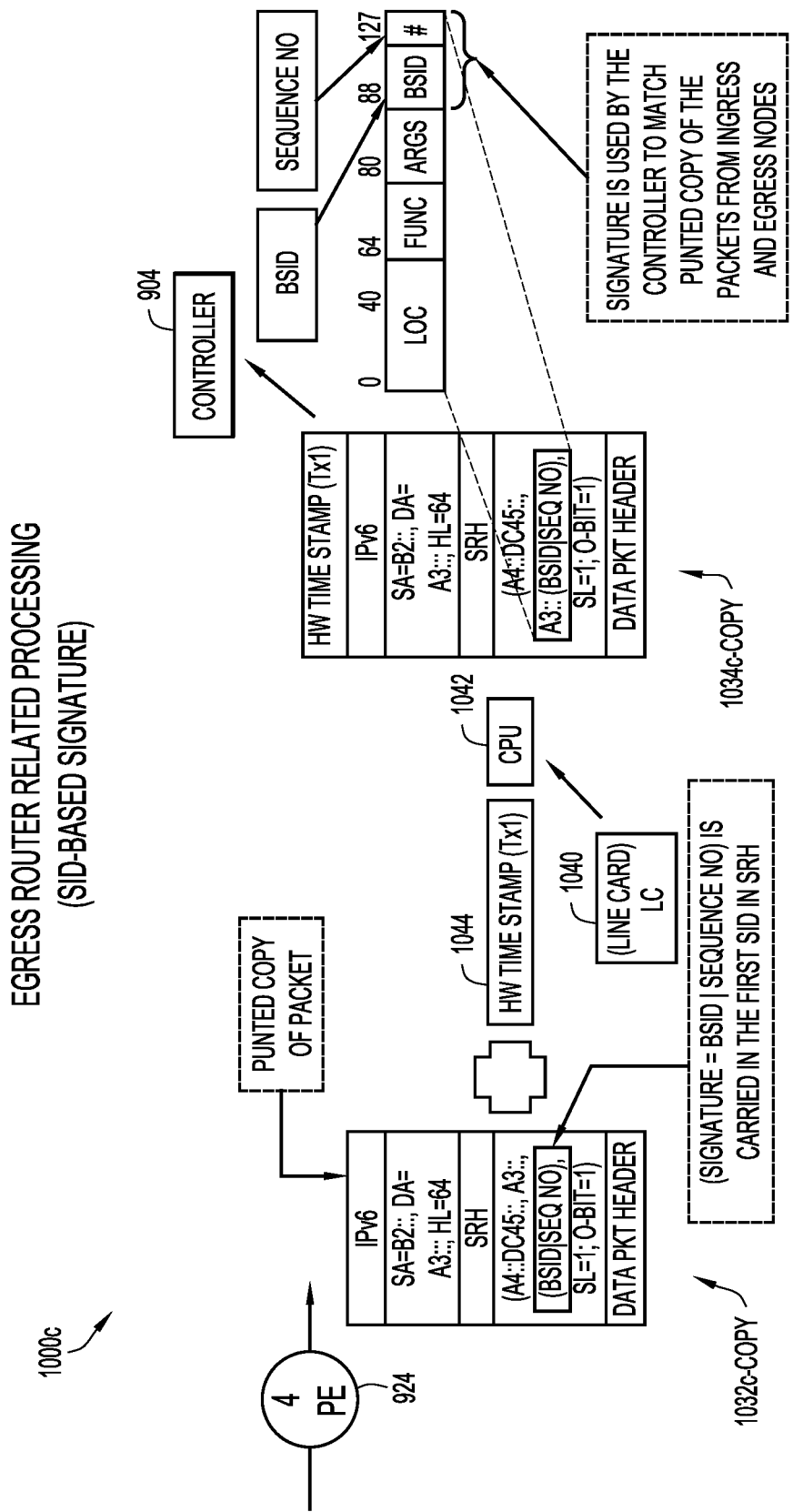

FIG. 10C is a network node diagram for describing metadata or iOAM processing in relation to an egress node, with use of a SID-based signature according to some implementations. This procedure may be complementary to driving the signature from the packet payload itself. This procedure may use SID information, and may be very hardware-efficient as it does not need to employ any TLV manipulation. The SID function may accessible in the hardware and operation to drive the signature may be performed when the SID is being accessed by the data-plane.

Here, the procedure may be the same or substantially the same as observed by the ingress node (and segment nodes) per FIG. 9C. Again, a data packet copy 1032c-copy ("punted copy") may be obtained. The hardware timestamp 1044 (T×1) may also be obtained (e.g. from the LC 1040) and provided in a punt header of the copy. Here, the fast path may insert (signature=BSID|Sequence Number) in the argument of SRH.SID[SL]—48 bits. The policy ID and sequence number may already be encoded in the packet at argument of the first SID. The slow path may receive the punted copy with the hardware timestamp (T×1) and signature, where CPU 1042 may export the copy (i.e. a data packet copy 1034c-copy) to controller 904 in accordance with streaming telemetry or, alternatively, NetFlow export may be used. Note that since the information is encoded in the argument of the SID, the SID value may still be used for any other purpose (e.g., SRH reversal, etc.)

Regarding processing at segment end nodes, packets may arrive with the SRH.Flags.O=1. As the SRH.Flags.O bit=1, a segment end node may instruct a "Punt a Timestamped Copy and Forward" behavior or a "Forward and Punt a Timestamped Copy" behavior. The processing at the segment end node is the same or very similar to the processing at the egress node and hence it is not repeated here.

FIG. 11 is a table 1100 of example data associated with the correlating of stamped packets at a controller according to some implementations. The controller may receive timed-stamped punted copies of the same packet (as well as different packets) from ingress, egress and each segment node. Each copy of the original data packet may be associated with a packet signature (e.g. packet copy 1 is associated with signature 1; packet copy 2 is associated with signature 2; and packet copy 3 is associated with signature 3). For copies of the same original data packet, these signatures will be the same. The controller may process and sort the packet copies based on the signatures (and e.g. the sending node's IP address or other identification). Other relevant information is shown in table 1100, including a timestamp associated with each node and computed time differentials or delays as indicated. As is apparent, the controller may correlate the time stamps to identify segment-by-segment delays or end-to-end delay. The controller may also perform a proof-of-transit check using the copy of the same packet received from ingress, egress and the transit nodes. Note further that the controller may be configured to handle packet loss. In fact, it may detect losses in a sampled stream (e.g. especially when sequence number is used in SRH). The controller may be configured to handle out-of-order packets, as sampled packets may be keyed on signature. For example, T2 may be greater than T4 per the table.

The techniques described above may be applicable to other networks and/or network protocols. For example, the techniques may be applied to SR-MPLS-based networks. One of the current limitations of SR-MPLS data-plane is that it cannot carry metadata (TLVs) in the data packets. Therefore, at least some current "In-situ OAM" mechanisms are not applicable to SR-MPLS. As the SDN-based procedure proposed herein does not require data packets to carry any meta-data, the procedure may advantageously be applied to such SR-MPLS-based networks.

For SR-MPLS, iOAM processing may be instructed with use of an indicator according to some implementations as follows. For one, an indicator may be provided in the most significant byte (MSB) in a time-to-live (TTL) field of MPLS (VPN) label. On the other hand, an indicator may be provided using a Generic Associate Label (Gal) or Generic Associated Channel (GAch) Labels with a control word. Further, an indicator may be provided using a local label assigned by an egress node. Finally, an indicator may be provided with use of a newly defined, special-purpose label.

As is apparent, an iOAM "sampling" label may be used in SR-MPLS for the same or similar purpose as the SRH-.Flags.O bit in SRv6. This is an SDN-based approach where an SDN controller may co-ordinate a sampling label between ingress and egress nodes of an SR-MPLS policy. The sampling label may instruct the egress node that, if the traffic arrives with the sampling label, it is marked in-band OAM using a "Punt a Timestamped Copy and Forward" behavior or a "Forward and Punt a Timestamped Copy" behavior.

Figure 12A:
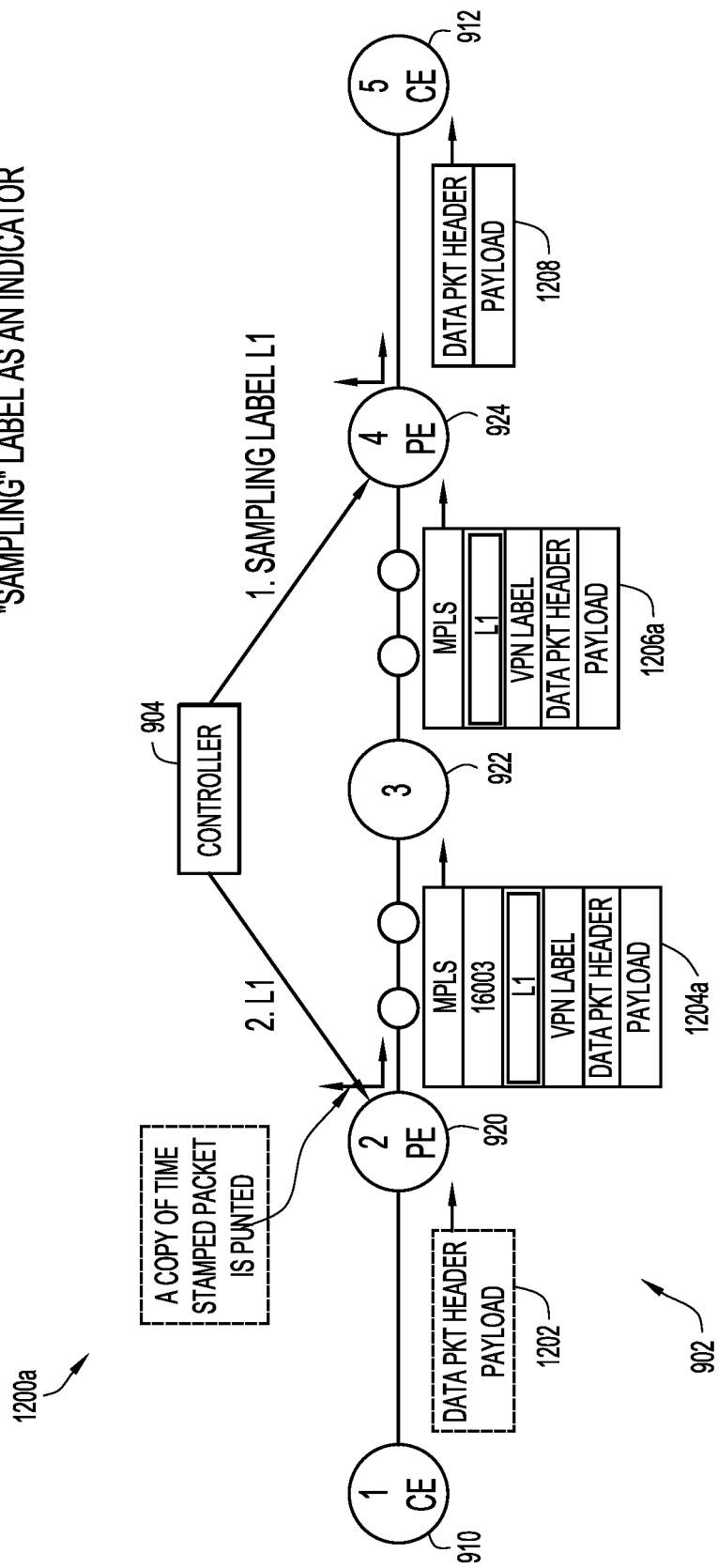
FIG. 12A is a network node diagram for describing metadata or iOAM processing associated with the nodes using SR Multiprotocol Label Switching (SR-MPLS), where an iOAM "sampling" label may be used for indication according to some implementations.

FIG. 12A is a network node diagram 1200a for describing metadata or iOAM processing associated with an SR-MPLS based network. The work flow may be as follows. The controller 904 (e.g. SDN controller) learns that customers would like to enable iOAM on customer traffic with respect to a given policy. The controller 904 may solicit a sampling label L1 from egress node (i.e. PE router 924) (i.e. the end point of the SR MPLS policy). The egress node may assign a label (e.g. "L1") for sampling. Here, "L1" is a local label at the egress node; the egress understands the semantics that it is to use for sampling. The controller 904 may communicate this label L1 to the ingress node (i.e. PE router 920) as the "sampling" label. For the packets that are internally marked for sampling, the sampling label L1 is pushed (e.g. to convey sampling to the egress). Thus, in FIG. 12A, an incoming data packet 1202 is communicated to PE router 920 (i.e. the ingress node), which communicates an MPLS data packet 1204a having sampling label L1 to network node 922, which communicates an MPLS data packet 1206a having sampling label L1 to PE router 924 (i.e. the egress node), which communicates an outgoing data packet 1208 (non-MPLS) to CE router 912. If L1 is identified at the egress node (i.e. PE router 924), the network node may implement a "Punt a Timestamped Copy and Forward" behavior or a "Forward and Punt a Timestamped Copy" behavior. No metadata needs to be inserted or carried in the forwarded packet (the signature is derived from the payload).

Figure 12B:
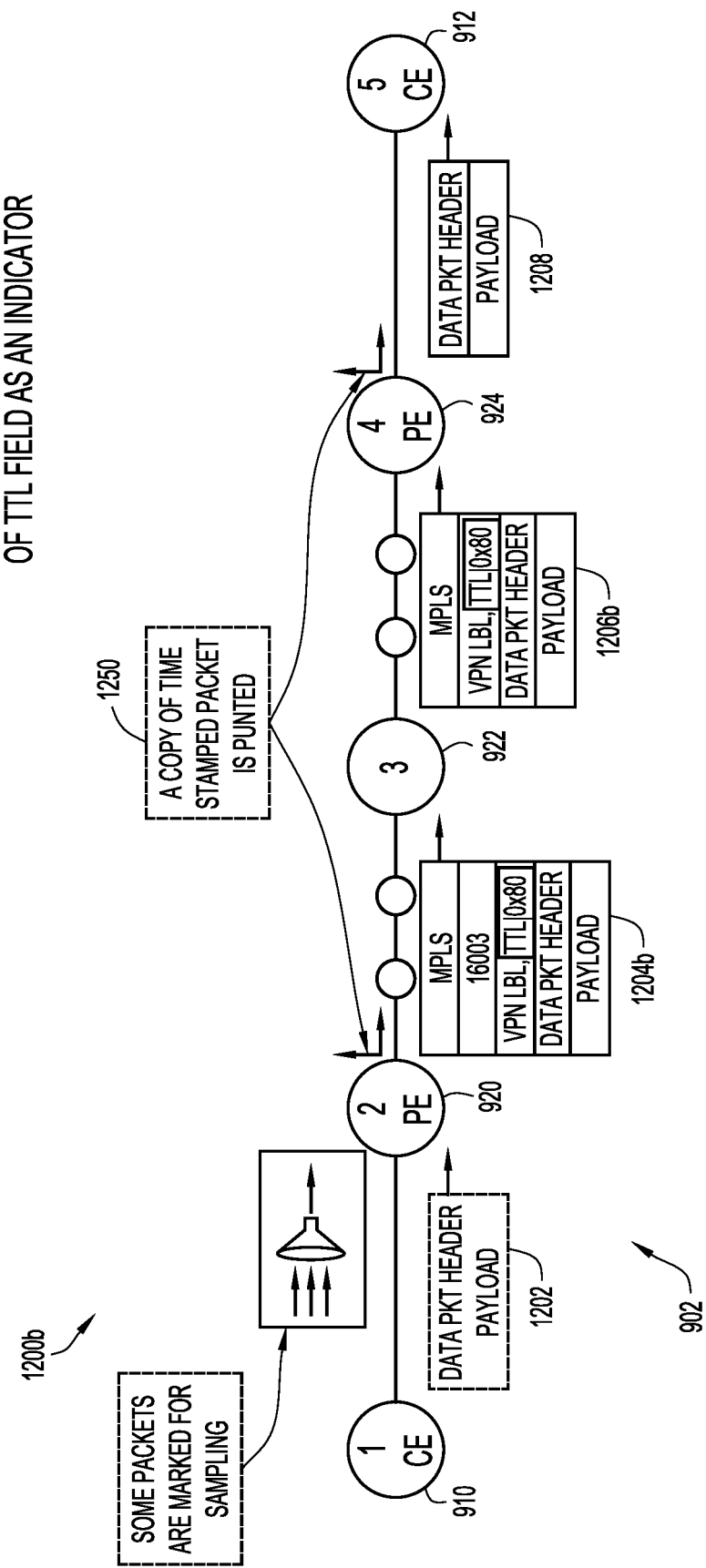
FIG. 12B is a network node diagram for describing metadata or iOAM processing associated with the nodes using SR-MPLS, where the most significant byte (MSB) in a time-to-live (TTL) field may be used for indication according to some implementations.

FIG. 12B is a network node diagram 1200b for describing metadata or iOAM processing in an SR-MPLS network. Here, the MSB in the TTL field of MPLS (VPN) label may be used for the same purpose as the SRH.Flags.O bit for SRv6. For packets that are internally marked for sampling, the TTL for the bottom most label is set with MSB=1. In FIG. 12B, incoming data packet 1202 is communicated to PE router 920 (i.e. the ingress node), which communicates an MPLS data packet 1204b having the predefined TTL setting (i.e. MSB=1) to network node 922, which communicates an MPLS data packet 1206a having the predefined TTL setting to PE router 924 (i.e. the egress node), which communicates an outgoing data packet 1208 (non-MPLS) to CE router 912. If the predefined TTL setting is identified the egress node (i.e. PE router 924), the network node may implement a "Punt a Timestamped Copy and Forward" behavior or a "Forward and Punt a Timestamped Copy" behavior. No metadata needs to be inserted or carried in the forwarded packet (the signature is derived from the payload).

Figure 13:
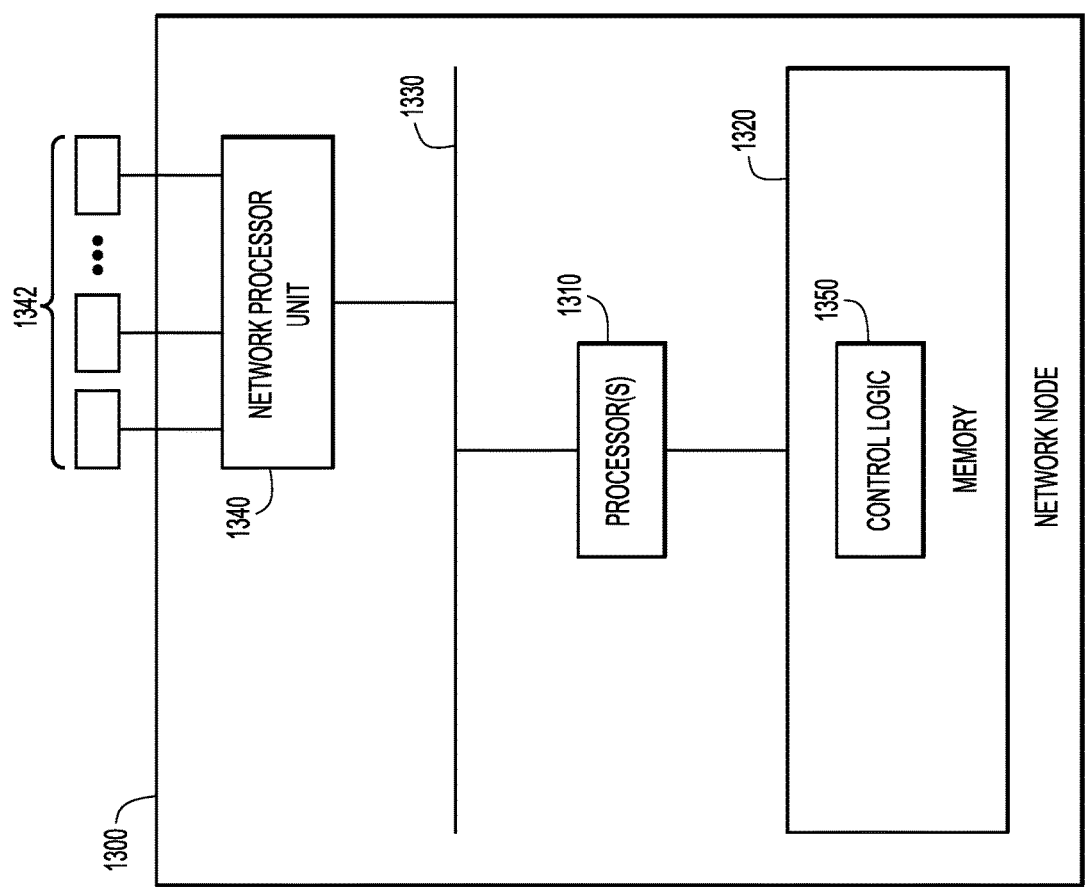
FIG. 13 illustrates a block diagram of a network element or node (e.g. a router or switch) configured to perform operations described herein.

FIG. 13 illustrates a block diagram of a network element or node 1300 (e.g. a router or switch) configured to perform operations described above, for example, in connection with FIG. 7 and associated figures. The network node 1300 includes one or more control processors 1310, memory 1320, a bus 1330 and a network processor unit 1340. The control processor 1310 may be a microprocessor or microcontroller. The network processor unit 1340 may include one or more ASICs, linecards, etc., and facilitates network communications between the node 1300 and other network nodes.

There are a plurality of network ports 1342 at which the node 1300 receives packets and from which the node 1300 sends packets into the network. The processor 1310 executes instructions associated with software stored in memory 1320. Specifically, the memory 1320 stores instructions for control logic 1350 that, when executed by the processor 1310, causes the processor 1310 to perform various operations on behalf of the node 1300 as described herein. The memory 1320 also stores configuration information 1360 received from a network controller to configure the network node according to desired network functions. It should be noted that in some embodiments, the control logic 1350 may be implemented in the form of firmware implemented by one or more ASICs as part of the network processor unit 1340.

The memory 1320 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1320 may comprise one or more tangible (non-transitory) computer readable storage media (e.g., a memory device) encoded with software comprising computer executable instructions and when the software is executed (by the processor 1310) it is operable to perform certain network node operations described herein.

Figure 14:
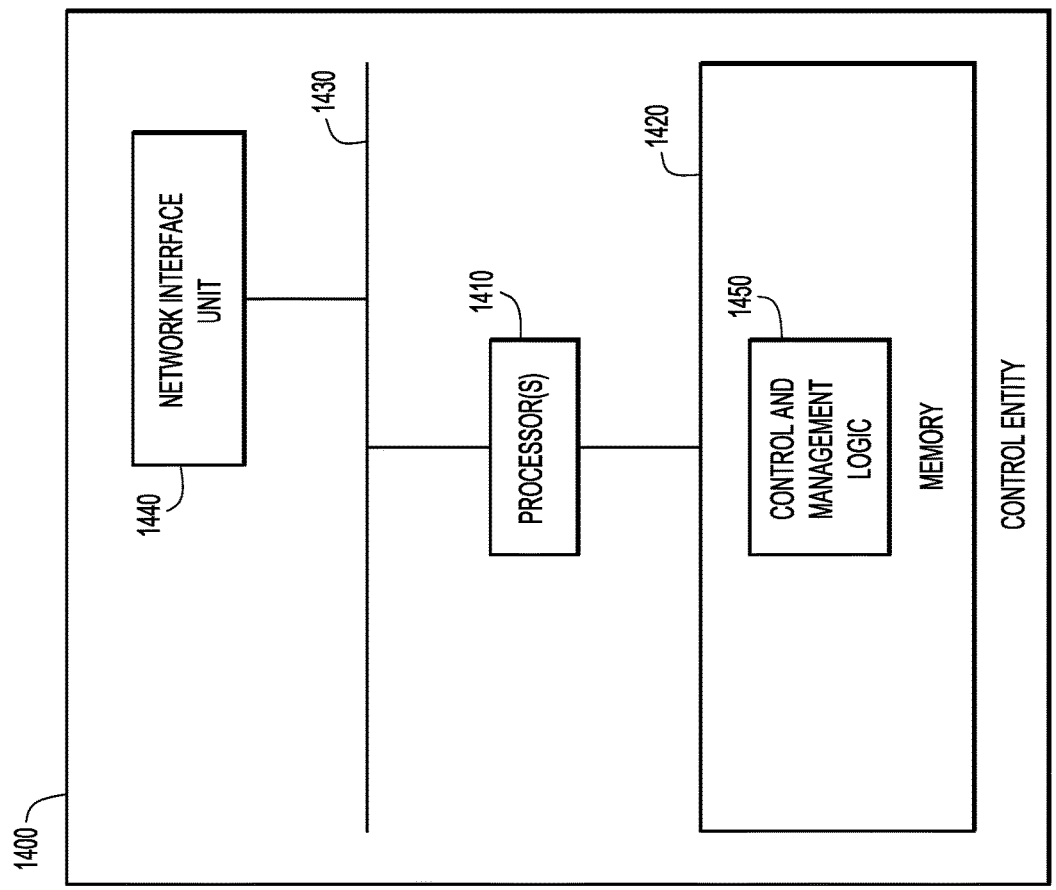
FIG. 14 illustrates a block diagram of a computing/control entity that may perform the functions of the controller or other analytics entity as described herein.

FIG. 14 illustrates a block diagram of a computing/control entity 1400 that may perform the functions of the controller (e.g. SDN) or other analytics entity as described herein. The computing/control entity 1400 includes one or more processors 1410, memory 1420, a bus 1430 and a network interface unit 1440, such as one or more network interface cards that enable network connectivity. The memory 1420 stores instructions for control and management logic 1450, that when executed by the processor 1410, cause the processor to perform the software defined network controller operations described herein.

The memory 1420 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1420 may comprise one or more tangible (non-transitory) computer readable storage media (e.g., a memory device) encoded with software comprising computer executable instructions and when the software is executed (by the processor 1410) it is operable to perform the network controller operations described herein.

Some implementations of the present disclosure have been shown in the figures to apply to a 5G network. Here, network nodes (e.g. routers, switches) of the present disclosure may be employed along the N3 interface or N6 interface of the 5G network, as examples. Other implementations may be readily applied to other types networks, such as other SR-type networks, as well as other mobile networks including 4G, Long Term Evolution (LTE) based networks having a control and user plane separation (CUPS) architecture, as one ordinarily skilled in the art will readily appreciate. In 4G/LTE with CUPS, the user plane function may be a gateway—user plane (GW-U). As other examples, the SMF may instead be a GW—control plane (GW-C), the AMF may instead be a mobility management entity (MME), the PCF may instead be a policy and control rules function (PCRF). The SMF and GW-C may be more generally referred to as a CP entity for session management.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first data packet could be termed a second data packet, and similarly, a second data packet could be termed a first data packet, without changing the meaning of the description, so long as all occurrences of the "first data packet" are renamed consistently and all occurrences of the "second data packet" are renamed consistently. The first data packet and the second data packet are both data packets, but they are not the same data packet.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition

What is claimed is:

1. A method comprising:
at a network node,
receiving a data packet;
if an indicator for sampling the data packet is identified:
encoding a signature for the data packet as Segment Identifier (SID) information and inserting the signature in a segment routing (SR) header of the data packet;
copying the data packet for producing a data packet copy having the signature encoded as the SID information;
timestamping the data packet copy for producing a timestamped data packet copy having the signature encoded as the SID information;
sending the timestamped data packet copy to a controller for signature-based correlation with one or more other timestamped data packet copies of the data packet from one or more other network nodes based; and
forwarding the data packet to a next network node.

2. The method of claim 1, wherein timestamping comprises hardware-timestamping the data packet copy with a hardware timestamp.

3. The method of claim 2, wherein copying the data packet is part of:
a function for punting the timestamped data packet copy and forwarding; or
a function for forwarding and punting the timestamped data packet copy.

4. The method of claim 1, wherein the data packet comprises an SR for IPv6 (SRv6) packet.

5. The method of claim 1, further comprising the network node refraining from adding any metadata to a type-length value (TLV) of the SR header of the data packet.

6. The method of claim 1, wherein forwarding the data packet comprises forwarding the data packet without a timestamp to the next network node.

7. The method of claim 1, wherein forwarding the data packet comprises forwarding the data packet with the signature as the SID information in the SR header to the next network node.

8. The method of claim 7, further comprising:
setting an O-bit in the SR header of the data packet to indicate sampling at the next network node.

9. The method of claim 1, wherein encoding and inserting the signature in the SR header comprises encoding and inserting the signature as a Binding SID (BSID) and a sequence number in the SR header.

10. The method of claim 9,
wherein the signature is encoded and inserted as the BSID and the sequence number in an argument field of a SID in the SR header.

11. The method of claim 1, wherein sending the timestamped data packet copy comprises sending the timestamped data packet copy to the controller for computation of a delay between timestamps of copies of one or more other data packets from the one or more other network nodes having a same signature.

12. A network node comprising:
one or more interfaces;
one or more processors;
circuitry configured to:
receive a data packet;
if an indicator for sampling the data packet is identified:
encode a signature for the data packet as Segment Identifier (SID) information and insert the signature in a segment routing (SR) header of the data packet;
copy the data packet for producing a data packet copy having the signature encoded as the SID information;
timestamp the data packet copy for producing a timestamped data packet copy having the signature encoded as the SID information;
send the timestamped data packet copy to a controller for signature-based correlation with one or more other timestamped data packet copies of the data packet from one or more other network nodes; and
forward the data packet with the signature encoded as the SID information to a next network node.

13. The network node of claim 12, wherein the circuitry is further configured to timestamp the data packet copy with a hardware timestamp, and wherein the circuitry is further configured to copy the data packet as part of:
a function for punting the timestamped data packet copy and forwarding; or
a function for forwarding and punting the timestamped data packet copy.

14. The network node of claim 12, wherein:
the circuitry is further configured to encode and insert the signature as a Binding SID (BSID) and a sequence number in the SR header.

15. A method comprising:
at a controller,
receiving from a network node a timestamped data packet copy of a data packet that is forwarded from the network node to a next network node;
obtaining a signature that is encoded as Segment Identifier (SID) information from a segment routing (SR) header of the timestamped data packet copy;
performing a signature-based correlation of the timestamped data packet copy with one or more other received timestamped copies of the data packet from one or more other network nodes having a same signature as the timestamped data packet copy, to produce signature-correlated timestamped data packet copies; and
computing a delay of the data packet between network nodes based on timestamps of the signature-correlated timestamped data packet copies.

16. The method of claim 15, wherein the controller comprises one of a software-defined network (SDN) controller or an analytics function such as a network data analytics function (NWDAF).

17. The method of claim 15, wherein the signature that is encoded as the SID information comprises a Binding SID (BSID) and a sequence number associated with the data packet.

18. The method of claim 17, wherein the signature that is encoded as the SID information comprising the BSID and the sequence number is obtained from an argument field of a SID in the SR header.

19. The method of claim 15, wherein the timestamped data packet copy comprises a segment routing (SR) for IPv6 (SRv6) packet.

20. The method of claim 15, wherein the signature that is encoded as the SID information is obtained from a segment list (SL) of the SR header.

* * * * *